US006668521B1

(12) United States Patent
Weder et al.

(10) Patent No.: US 6,668,521 B1
(45) Date of Patent: *Dec. 30, 2003

(54) METHOD FOR APPLYING A BAND ABOUT A SHEET OF MATERIAL AND A FLORAL GROUPING

(75) Inventors: Donald E. Weder, Highland, IL (US); William F. Straeter, Breese, IL (US); Joseph G. Straeter, Highland, IL (US)

(73) Assignee: Southpac Trust International, Inc., Highland, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 09/012,907

(22) Filed: Jan. 23, 1998

Related U.S. Application Data

(63) Continuation of application No. 08/645,369, filed on May 13, 1996, now abandoned, which is a continuation of application No. 08/468,492, filed on Jun. 6, 1995, now Pat. No. 5,632,131, which is a continuation of application No. 08/202,313, filed on Feb. 25, 1994, now Pat. No. 5,465,553, which is a continuation of application No. 07/934,832, filed on Aug. 24, 1992, now Pat. No. 5,426,914, which is a continuation-in-part of application No. 07/819,311, filed on Jan. 9, 1992, now abandoned, which is a continuation of application No. 07/765,416, filed on Sep. 26, 1991, now Pat. No. 5,105,599, which is a continuation of application No. 07/530,491, filed on May 29, 1990, now abandoned, which is a continuation of application No. 07/315,169, filed on Feb. 24, 1989, now abandoned, said application No. 07/934,832, filed on Aug. 24, 1992, now Pat. No. 5,426,914, is a continuation-in-part of application No. 07/832,096, filed on Feb. 6, 1992, now abandoned, which is a continuation-in-part of application No. 07/765,416, filed on Sep. 26, 1991, now Pat. No. 5,105,599, which is a continuation of application No. 07/530,491, filed on May 29, 1990, now abandoned, which is a continuation of application No. 07/315, 169, filed on Feb. 24, 1989, now abandoned.

(51) Int. Cl.[7] .............................................. B65B 11/00

(52) U.S. Cl. ............................................. 53/399; 53/414
(58) Field of Search .......................... 53/399, 397, 449, 53/176, 464, 461, 390, 221, 582, 580, 583, 592, 585, 138.1, 139.1, 137.1, 419, 417; 47/72; 206/423

(56) References Cited

U.S. PATENT DOCUMENTS

| 2,133,278 A | 10/1938 | Brogden |
| 2,236,936 A | 4/1941 | Camp |
| 2,274,526 A | 2/1942 | Bunn |

(List continued on next page.)

FOREIGN PATENT DOCUMENTS

FR    1084888    10/1953

OTHER PUBLICATIONS

Rubber Band Technology, Ltd. Yakima, WA *Bandmaster 102 Model ET* (No date).

(List continued on next page.)

*Primary Examiner*—Stephen F. Gerrity
(74) *Attorney, Agent, or Firm*—Dunlap Codding & Rogers, P.C.

(57) ABSTRACT

A band applicator for applying a band about a sheet of material disposed about a pot to provide a decorative cover for the pot. The band applicator includes a pot frame having a pot opening and a band holder configured to releasably hold a plurality of bands. The sheet of material is extended about the outer peripheral surface of the pot, and the pot with the sheet of material disposed thereabout is disposed in a pot receiving space in the pot frame. The pot frame holds the sheet of material positioned about the pot. A band is removed from the band holder and disposed about the sheet of material and pot for cooperating to hold the sheet of material positioned about the pot.

1 Claim, 13 Drawing Sheets

U.S. PATENT DOCUMENTS

| | | |
|---|---|---|
| 2,367,168 A | 1/1945 | Cheesman |
| 2,514,038 A * | 7/1950 | Doolittle |
| 2,882,660 A | 4/1959 | Denton |
| 2,924,926 A | 2/1960 | Paine, Jr. |
| 2,971,312 A | 2/1961 | Bell, Jr. |
| 2,972,747 A | 2/1961 | Kelem |
| 3,015,916 A | 1/1962 | Denton |
| 3,078,631 A | 2/1963 | Seserman |
| 3,104,937 A | 9/1963 | Wyckoff et al. |
| 3,125,907 A | 3/1964 | Derrickson |
| 3,126,686 A | 3/1964 | Kobylanski et al. |
| 3,129,728 A | 4/1964 | Sharko |
| 3,135,192 A | 6/1964 | Derrickson |
| 3,152,539 A | 10/1964 | Sorensen |
| 3,163,899 A | 1/1965 | Karass |
| 3,164,372 A | 1/1965 | Derrickson |
| 3,186,333 A | 6/1965 | Hoffman et al. |
| 3,189,060 A | 6/1965 | Attas |
| 3,192,584 A | 7/1965 | Pape |
| 3,224,363 A | 12/1965 | Talbot |
| 3,251,295 A | 5/1966 | Dickens |
| 3,258,221 A | 6/1966 | Derrickson et al. |
| 3,263,599 A | 8/1966 | Dickens |
| 3,264,022 A | 8/1966 | Talbot |
| 3,279,354 A | 10/1966 | Dickens et al. |
| 3,316,687 A | 5/1967 | Bartlett, Jr. |
| 3,318,230 A | 5/1967 | Hilton |
| 3,324,217 A | 6/1967 | Armstrong et al. |
| 3,368,323 A | 2/1968 | Wood |
| 3,393,633 A | 7/1968 | Hoffman et al. |
| 3,431,706 A | 3/1969 | Struck |
| 3,531,910 A | 10/1970 | Snead |
| 3,545,723 A | 12/1970 | Raley |
| 3,554,846 A | 1/1971 | Billett |
| 3,612,480 A | 10/1971 | Guy |
| 3,612,481 A | 10/1971 | Guy |
| 3,636,861 A | 1/1972 | Weller |
| 3,639,530 A | 2/1972 | Ryan |
| 3,662,790 A | 5/1972 | Goodley |
| 3,709,758 A | 1/1973 | Gilmore |
| RE27,744 E | 8/1973 | Billett et al. |
| 3,750,239 A | 8/1973 | Styner |
| 3,759,169 A | 9/1973 | Goodley |
| 3,783,079 A | 1/1974 | Wehr |
| 3,799,835 A | 3/1974 | Gilmore |
| 3,826,443 A | 7/1974 | Goodley |
| 3,841,213 A | 10/1974 | Goodley |
| 3,847,071 A | 11/1974 | Goodley |
| 3,851,683 A | 12/1974 | Glaus et al. |
| 3,873,387 A | 3/1975 | Schoening |
| 3,896,525 A | 7/1975 | Stewart, Jr. et al. |
| 3,949,662 A | 4/1976 | Woomer |
| 3,963,191 A | 6/1976 | Goodley |
| 3,974,762 A | 8/1976 | Kita et al. |
| 3,984,278 A | 10/1976 | Styner et al. |
| 3,995,409 A | 12/1976 | Discavage et al. |
| 4,005,647 A | 2/1977 | Goodley et al. |
| 4,020,756 A | 5/1977 | Weiss |
| 4,020,879 A | 5/1977 | Billett |
| 4,041,672 A | 8/1977 | Gularte |
| 4,062,918 A | 12/1977 | Nakanose |
| 4,086,117 A | 4/1978 | Pearsall |
| 4,090,008 A | 5/1978 | Haley |
| 4,093,146 A | 6/1978 | Haley |
| 4,096,019 A | 6/1978 | Lehmann |
| 4,101,625 A | 7/1978 | Haley |
| 4,137,788 A | 2/1979 | Fischer |
| 4,152,475 A | 5/1979 | Haley |
| 4,216,620 A | 8/1980 | Weder |
| 4,220,493 A | 9/1980 | Wehr et al. |
| 4,223,704 A | 9/1980 | Glaus |
| 4,227,949 A | 10/1980 | Wehr |
| 4,252,158 A | 2/1981 | McDade |
| 4,253,227 A | 3/1981 | Bullington |
| 4,254,703 A | 3/1981 | Fulton et al. |
| 4,297,811 A | 11/1981 | Weder |
| 4,300,312 A | 11/1981 | Weder |
| 4,300,976 A | 11/1981 | Wehr |
| 4,328,742 A | 5/1982 | Discavage |
| 4,383,881 A | 5/1983 | Saki |
| RE31,353 E | 8/1983 | Cheung |
| 4,401,020 A | 8/1983 | Brux |
| 4,444,097 A | 4/1984 | Wehr |
| 4,450,032 A | 5/1984 | Wehr |
| 4,454,808 A | 6/1984 | Wehr |
| 4,470,241 A | 9/1984 | Parry et al. |
| 4,483,516 A | 11/1984 | Wehr |
| 4,502,911 A | 3/1985 | Discavage |
| 4,533,046 A | 8/1985 | Kuhnert et al. |
| 4,536,248 A | 8/1985 | Bullington et al. |
| 4,554,779 A | 11/1985 | Fischer |
| 4,555,893 A | 12/1985 | Nakata et al. |
| 4,570,415 A | 2/1986 | Centeno |
| 4,572,251 A | 2/1986 | Drury |
| 4,601,155 A | 7/1986 | Lewis |
| 4,635,542 A | 1/1987 | Sebelist et al. |
| 4,711,071 A | 12/1987 | Kagi |
| 4,718,219 A | 1/1988 | Schmitz |
| 4,733,521 A | 3/1988 | Weder et al. |
| D295,525 S | 5/1988 | Sakaki et al. |
| 4,768,276 A | 9/1988 | Harlow |
| 4,773,182 A | 9/1988 | Weder |
| 4,794,832 A | 1/1989 | Trimble |
| 4,835,834 A | 6/1989 | Weder |
| 4,885,898 A | 12/1989 | Khurgin |
| 5,077,937 A | 1/1992 | Weder et al. |
| 5,085,003 A | 2/1992 | Garcia |
| 5,105,599 A | 4/1992 | Weder |
| 5,111,638 A | 5/1992 | Weder et al. |
| 5,157,899 A | 10/1992 | Tas |
| 5,339,601 A | 8/1994 | Weder et al. |
| 5,373,942 A * | 12/1994 | Weder ..................... 53/399 X |
| 5,417,033 A | 5/1995 | Weder |
| 5,426,914 A | 6/1995 | Weder et al. |
| 5,465,552 A | 11/1995 | Weder et al. |
| 5,465,553 A | 11/1995 | Weder et al. |
| 5,471,816 A | 12/1995 | Weder et al. |
| 5,632,131 A * | 5/1997 | Weder et al. .................. 53/399 |

OTHER PUBLICATIONS

Rubber Band Technology, Ltd. Yakima, WA *Bandmaster 102 Model AF* (No date).

Strapack Inc. Tokyo, Japan, Sivaron S–661M & 661Y. ©1984.

Strapack Inc. Tokyo, Japan, Strapack Semiautomatic Strapping Machine S–660 ©1988 Strapack Corp.

Universal Strapping Corp *Uni–Pac Portable Strapping Kit*, no date.

Cyklop Strapping Corp, Downington, PA Cyklop EM–15 (2 pgs) ©1987 Cyclop Strapping Corp.

Strapex Corp. Charlotte, NC How To Strap Without Getting In A Bind (2 pages, no date).

Cyklop Strapping Corp., Downington, PA ASM Series (2 pgs) ©1988 Cyklop Strapping Corp.

Strapack Corp, Tokyo, Japan, StraPack Semi–Automatic Strapping Machine, Sivaron S–662 (2 pgs. no date).

Strapack Corp, Tokyo, Japan, *StraPack Semi–Automatic Polypropylene Strapping Mach., Sivaron SS–40* (2 pgs) (No date).

Strapeck Corp, Tokyo, Japan, *StraPack Semi–Automatic Strap.Mach., Sivaron S–661 S661L* (2 pgs. no date).

Universal Strapping Corp. Brooklyn Ny *Universal Strapping Semi–Automatic Plastic Strapping Machine* (2 pgs).

Universal Strapping Corp, Brooklyn Ny *Universal Strapping Extruders Of Plastic Strapping* (8 pgs no date).

Malow Corp., Mount Prospect, ILL, *Heavy Duty Tyer* 2 pgs No Date.

Highland Supply Corp, Highland, ILL *The Original Pre–Formed Pot Cover*, 1984.

Rubber Band Technology, Ltd., Yakima, WA *BandMaster 101™ Model MF* (1 pg, no date).

Rubber Band Technology, Ltd., Yakima, WA *BandMaster™ 201 Model B* (No date).

BH Bunn Co, Alsip, Ill, *Strapping Efficiency For Every Strapping Application, #M20M–475* (6 pgs No date).

BH Bunn Co., Lakeland, FL, *Bunn Models 1691, 1991, 2091, 2491 & 3091 Typing Machines* ©1992 (3 pgs).

EAM Industries, W. Hazelton, PA *EAM Mosca Strapping System* (6 pgs, No date).

EAM Industries, W. Hazelton, PA *COM Taping Machine* (2 pgs, No date).

Clements Industries, Inc. S. Hackensack NJ *Tach–It Twisters, Packaging Machines, Bag Openers, Tape Winders* (No date).

Clements Industries, Inc. S. Hackensack NJ *Tach–It Twisters, Model 3558*, 1 pg 1986.

InterPower Packaging, Hodgkins, IL *Akebono OB–300* 2 pgs No date.

InterPower Packaging, Hodgkins, IL *Power 260*, 2 pgs, 1991.

The John Henry Co., Cellocoup Brochure, 4 pgs, ©1991.

Saxmayer Corp., St. Blissfield, MI *Twine Tying Machines* 7 pgs (No date).

Saxmayer Corp. St. Blissfield, MI *Model 6 String Tyer*, 2 pgs (No date).

Saxmayer Corp. St. Blissfield, MI *Model EM Route–Master* 2 pgs (No date).

Felins, Inc. Milwaukee, WS *Pak–Tyer 2000* 2 pgs, no date.

* cited by examiner

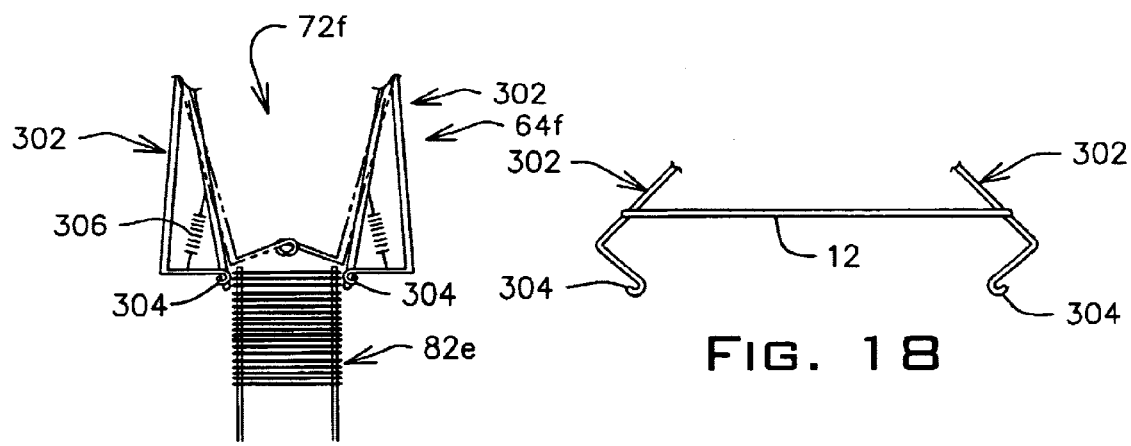
FIG. 17
FIG. 18
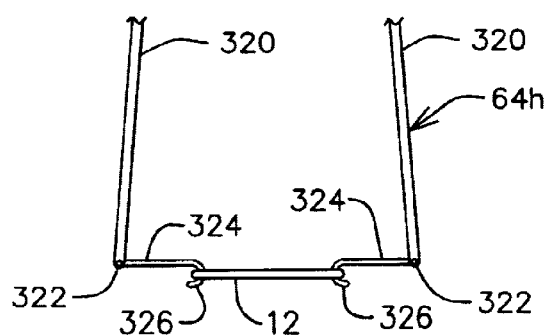
FIG. 19
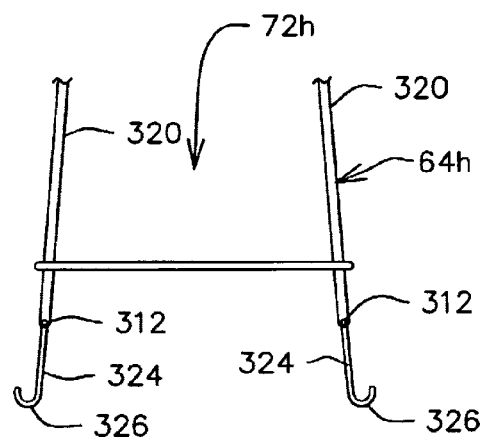
FIG. 20
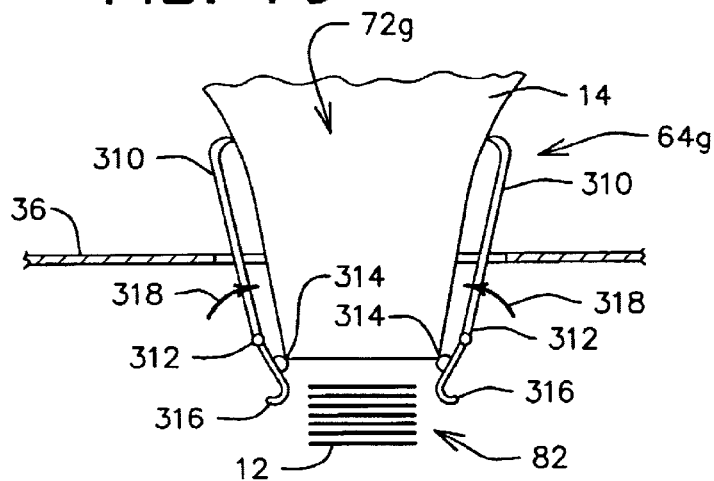
FIG. 21

US 6,668,521 B1

METHOD FOR APPLYING A BAND ABOUT A SHEET OF MATERIAL AND A FLORAL GROUPING

RELATED REFERENCES

This application is a continuation of application U.S. Ser. No. 08/645,369, filed May 13, 1996, entitled "METHOD FOR APPLYING A BAND ABOUT A SHEET OF MATERIAL AND A FLORAL GROUPING", abandoned; which is a continuation of U.S. Ser. No. 08/468,492, filed Jun. 6, 1995, entitled "METHOD FOR APPLYING A BAND ABOUT A SHEET OF MATERIAL AND A POT, now U.S. Pat. No. 5,632,131; which is a continuation of U.S. Ser. No. 08/202,313, filed Feb. 25, 1994, entitled "METHOD FOR APPLYING A BAND ABOUT A SHEET OF MATERIAL AND A POT", now U.S. Pat. No. 5,465,553; which is a continuation of U.S. Ser. No. 07/934,832, filed Aug. 24, 1992 entitled "BAND APPLICATOR FOR APPLYING A BAND ABOUT A SHEET OF MATERIAL AND A POT", now U.S. Pat. No. 5,426,914; which is a continuation-in-part of U.S. Ser. No. 07/819,311, filed Jan. 9, 1992, entitled "MEANS FOR SECURING A DECORATIVE COVER ABOUT A FLOWER POT", now abandoned; which is a continuation of U.S. Ser. No. 07/765,416, filed Sep. 26, 1991, entitled "MEANS FOR SECURING A DECORATIVE COVER ABOUT A FLOWER POT", now U.S. Pat. No. 5,105,599, issued Apr. 21, 1992; which is a continuation of U.S. Ser. No. 07/530,491, filed May 29, 1990, entitled "MEANS FOR SECURING A DECORATIVE COVER ABOUT A FLOWER POT", now abandoned; which is a continuation of U.S. Ser. No. 07/315,169, filed Feb. 24, 1989, entitled "MEANS FOR SECURING A DECORATIVE COVER ABOUT A FLOWER POT", now abandoned.

Said application Ser No. 07/934,832 filed Aug. 24, 1992, now U.S. Pat. No. 5,426,914 is also a continuation-in-part of U.S. Ser. No. 07/832,096, filed Feb. 6, 1992, entitled "MEANS FOR SECURING A DECORATIVE COVER ABOUT A FLOWER POT", now abandoned; which is a continuation-in-part of U.S. Ser. No. 07/765,416, filed Sep. 26, 1991, entitled "MEANS FOR SECURING A DECORATIVE COVER ABOUT A FLOWER POT", now U.S. Pat. No. 5,105,599, issued Apr. 21, 1992; which is a continuation of U.S. Ser. No. 07/530,491, filed May 29, 1990, entitled "MEANS FOR SECURING A DECORATIVE COVER ABOUT A FLOWER POT", now abandoned; which is a continuation of U.S. Ser. No. 07/315,169, filed Feb. 24, 1989, entitled "MEANS FOR SECURING A DECORATIVE COVER ABOUT A FLOWER POT", now abandoned.

FIELD OF THE INVENTION

The present invention relates generally to decorative covers for pots and, more particularly, but not by way of limitation, to a band applicator for applying a band about a sheet of material for cooperating to hold the sheet of material positioned about the pot to provide a decorative cover.

BRIEF DESCRIPTION OF THE DRAWINGS

FIG. 17 is a diagrammatic view of a modified band applicator.

FIG. 18 is a diagrammatic view of the modified band applicator of FIG. 17 showing the band applicator in a different position as compared to that shown in FIG. 17.

FIG. 19 is a diagrammatic view of another modified band applicator.

FIG. 20 is a diagrammatic view showing the band applicator of FIG. 19 in another position.

FIG. 21 is an elevational view of yet another modified band applicator.

DESCRIPTION OF THE PREFERRED EMBODIMENTS

Figure 1:
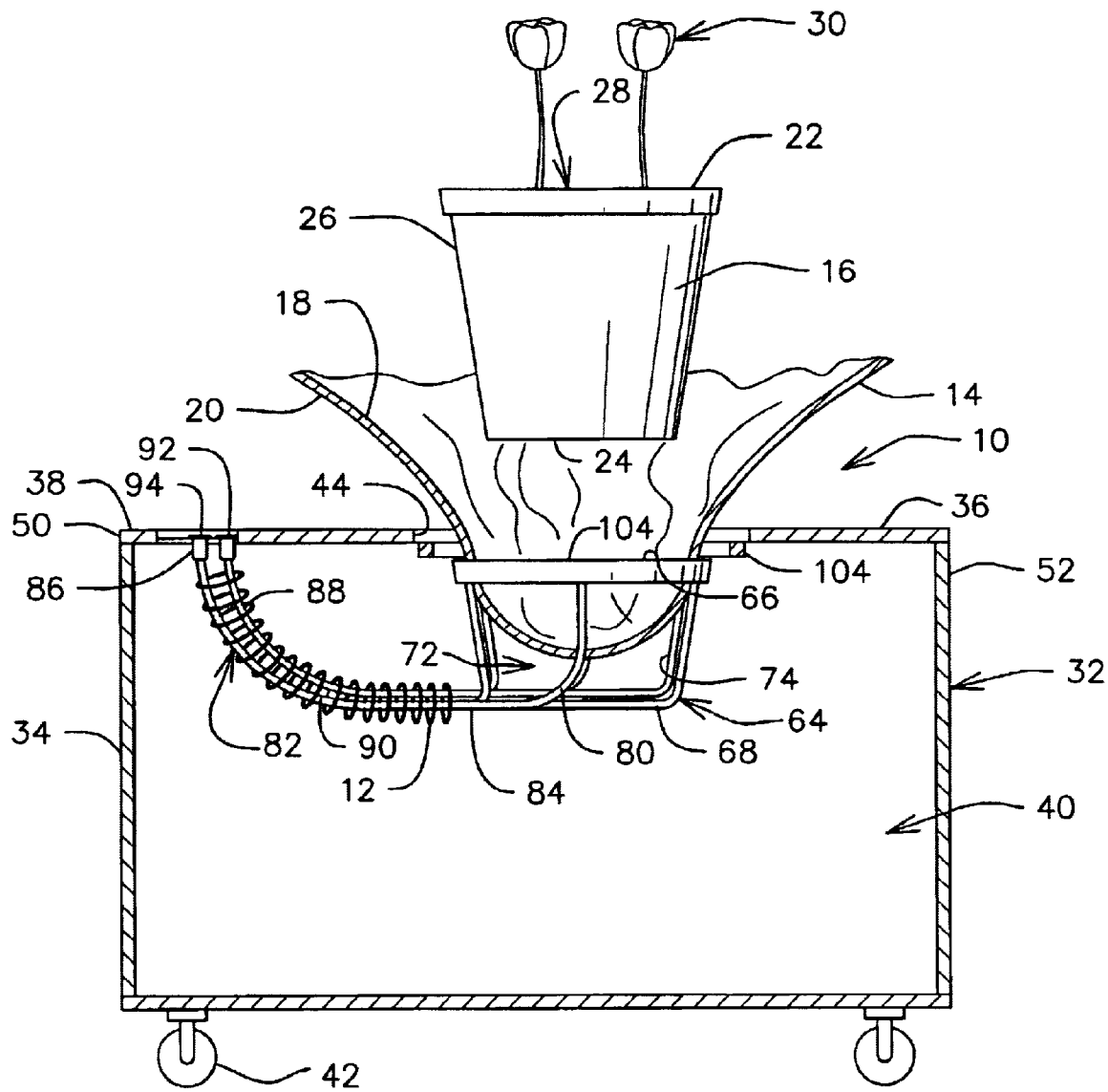
FIG. 1 is a side elevational view of a band applicator constructed in accordance with the present invention showing a sheet of material disposed on a top support surface and a flower pot disposed above the sheet of material.
Figure 2:
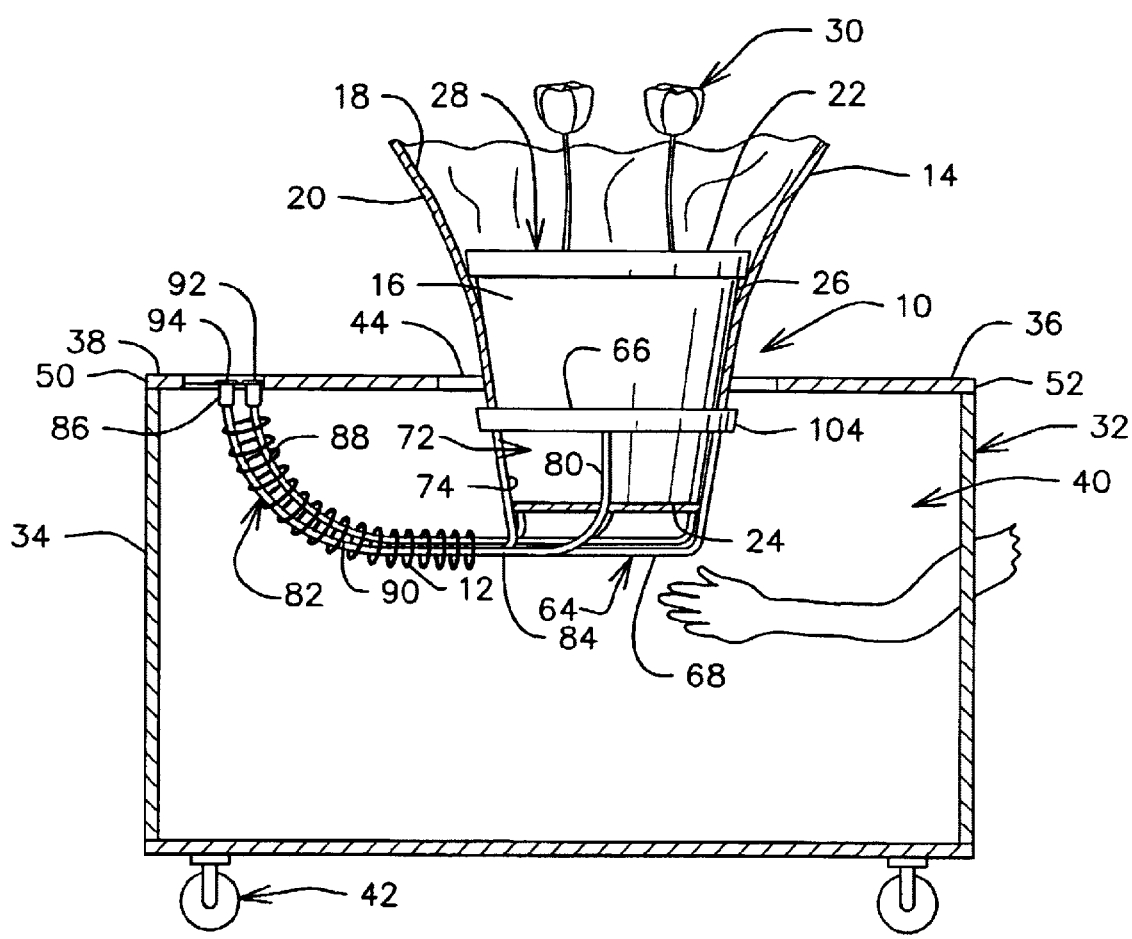
FIG. 2 is a sectional view of the band applicator showing the flower pot and the sheet of material disposed in a pot frame of the band applicator prior to a band being disposed about the sheet of material and about the flower pot.
Figure 3:
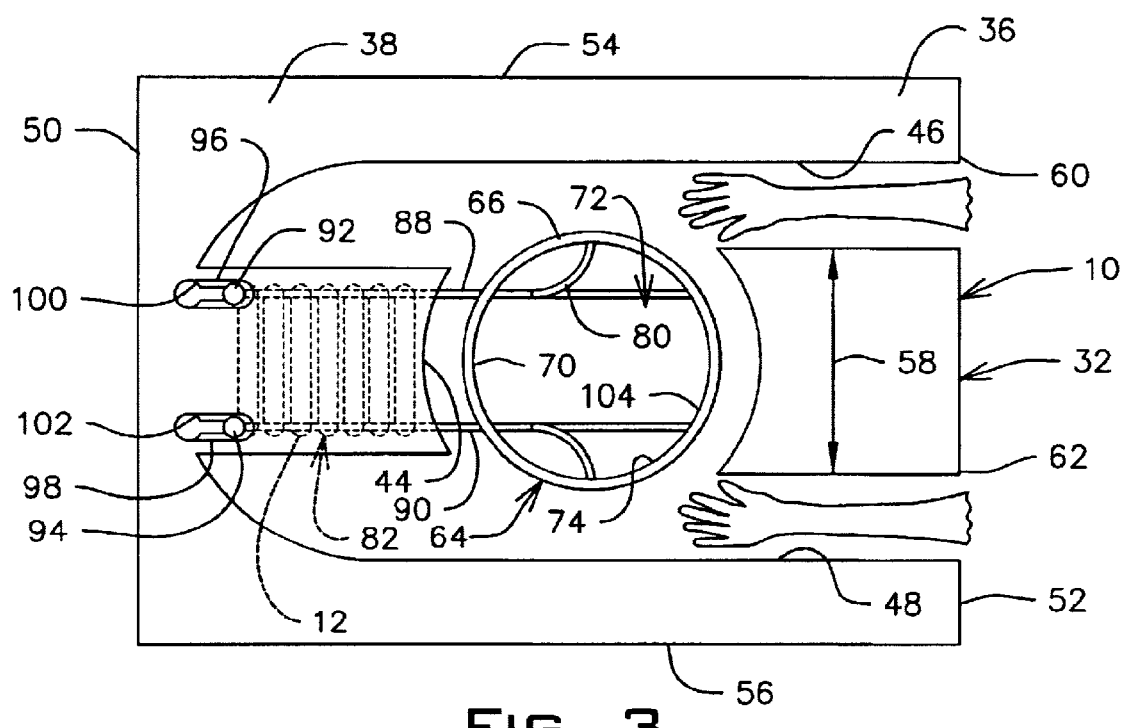
FIG. 3 is a top elevational view of the band applicator of FIG. 1.

Shown in FIGS. 1, 2 and 3 and designated therein by the general reference numeral 10 is a band applicator constructed in accordance with the present invention. The band applicator 10 is configured for applying a band (a plurality of bands being shown in FIGS. 2 and 3 and designated therein by the reference numeral 12 with only one of the bands being designated in FIGS. 2 and 3 by a specific reference numeral) about a sheet of material 14 disposed about a flower pot 16. In general, the sheet of material 14 is placed on the band applicator 10, the sheet of material 14 is formed about the flower pot 16 and the band 12 is secured about the sheet of material 14 for cooperating in holding the sheet of material 14 in position about the flower pot 16 for providing a decorative cover for the flower pot 16.

The band applicator 10 is described herein specifically as being configured to dispose a band about a sheet of material disposed about a flower pot. The present invention also is contemplated for use in applying a band around a sheet of material disposed about a floral grouping or other item. The term "floral grouping" as used herein means cut fresh flowers, artificial flowers, a single flower, other fresh and/or artificial plants or other floral materials and may include other secondary plants and/or ornamentation which add to the aesthetics of the overall floral grouping. The methods described herein thus also equally would be applicable for placing a band about a sheet of,material disposed about a floral grouping even though the invention specifically is described herein with respect to a flower pot.

As shown in FIGS. 1 and 2, the sheet of material 14 has an upper surface 18 and a lower surface 20. The sheet of material 14 is constructed from any suitable flexible material,that is capable of being wrapped about the flower pot 16. Preferably, the sheet of material 14 is constructed of a material selected from a group of materials consisting of paper, metal foil, cloth (natural or synthetic), denim, burlap or polymer film or combinations thereof.

The term "polymer film" as used herein means any polymer film. For example, but not by way of limitation, one polymer film is a polypropylene film. Another example of a polymer film, but not by way of limitation, is cellophane.

The sheet of material 14 has a thickness in a range from about 0.1 mils to about 30 mils. Preferably, the sheet of material 14 has a thickness in a range from about 0.1 mils to about 5 mils.

The sheet of material 14 may be any shape. The sheet of material 14 for example only may be square, rectangular, circular or any other geometric shape such as heart shaped for example only.

The sheet of material 14 may be constructed of a single layer of material or a plurality of layers of the same or different types of materials. Any thickness of the sheet of material 14 may be utilized in accordance with the present invention as long as the sheet of material 14 is wrappable about the flower pot 16, as described herein. Additionally, an insulating material such as bubble film, preferable as one of two or more layers, can be utilized in order to provide additional protection for the item wrapped therein. The layers of material comprising the sheet of material 14 may be connected together or laminated or may be separate layers.

A decorative pattern, such as a color and/or an embossed pattern, and/or other decorative surface ornamentation may be applied to the upper surface 18 and/or the lower surface 20 of the sheet of material 14 or portions thereof including, but not limited to printed design, coatings, colors, flocking or metallic finishes. The sheet of material 14 also may be totally or partially clear or tinted transparent material.

The sheet of material 14 also may be a cling wrap or cling material.

"Cling Wrap or cling Material" as used herein means any material which is capable of connecting to the sheet of material and/or itself upon contacting engagement during the wrapping process and is wrappable about an item whereby portions of the cling material contactingly engage and connect to other portions of the wrapping material for generally securing the sheet of material wrapped about at least a portion of the item. This connecting engagement is preferably temporary in that the wrapping material may be easily removed without tearing same, i.e., the cling material "clings" to the wrapping material. A Wrapping material remains securely connected to and about the wrapped item until the wrapping material is torn therefrom.

The cling material is constructed and treated if necessary, from polyethylene such as Cling Wrap made by Glad®, First Brands Corporation, Danbury, Conn. The thickness of the cling material will, in part, depend upon the thickness of the sheet of material utilized, i.e., generally, the thicker and therefore heavier sheet of material may require a thicker and therefore stronger cling material. The cling material will range in thickness from less than about 0.2 mils to about 10 mils, and preferably less than about 0.5 mils to about 2.5 mils and most preferably from less than about 0.6 mils to about 2 mils. However, any thickness of cling material may be utilized in accordance with the present invention which permits the cling material to function as described herein.

The flower pot 16 has an upper end 22, a lower end 24 and an outer peripheral surface 26 which extends generally between the upper and the lower ends 22 and 24. The flower pot 16 has a flower opening 28 formed through the upper end 22 thereof with the flower opening 28 extending a distance through the flower pot 16 and forming a retaining space (not shown) within the flower pot 16. Soil or holding materials such as a florist foam or the like generally is disposed in the retaining space in the flower pot 16 and a plant or flower is grown or extends from the retaining space outwardly a distance above the upper end 22 of the flower pot 16 (a plant or flower being diagrammatically shown in FIGS. 1 and 2 and designated therein by the general reference numeral 30).

The band applicator 10 includes a base frame 32 having side walls 34 and a top 36 with a substantially flat top support surface 38 formed thereon. The side walls 34 are interconnected to form a generally rectangularly shaped base frame 32. The top 36 is connected to an upper end of the side walls 34. The side walls 34 and the top 36 cooperate to substantially encompass a component space 40. The base frame 32 is rollingly supported on wheels 42 so that the band applicator 10 may be rollingly transported to various locations.

A top opening 44 is formed through the top 36 with the top opening 44 intersecting the top support surface 38 and the component space 40. The top opening 44 is illustrated in FIG. 2 as being basically circular shaped, although the top opening 44 could be any geometric shape if desired in a particular application. The top opening 44 has a diameter larger than the diameter formed by the outer peripheral surface 26 of the flower pot 16, for reasons which will be made more apparent below.

As shown in FIG. 3, a pair of access slots 46 and 48 are formed through the top 36. The top 36 has a first end 50, a second end 52, a first side 54 and a second side 56. The access slots 46 and 48 each intersect the second end 52 of the top 36 and each of the access slots 46 and 48 extend a distance from the second end 52 toward the first end 50 of the top 36. The access slots 46 and 48 are disposed between the first and the second sides 54 and 56. The access slot 46 is spaced a distance 58 from the access slot 48. The access slot 46 sometimes is referred to herein as the first access slot 46 and the access slot 48 sometimes is referred to herein as the second access slot 48. The access slots 46 and 48 each intersect the top opening 44 and cooperate to form a portion of the top opening 44.

A pair of access slots 60 and 62 also are formed through one of the side walls 34 with each of the access slots 60 and 62 being aligned with one of the access slots 46 and 48, the access slot 60 intersecting the access slot 46 and the access slot 62 intersecting the access slot 48. The access slots 46 and 60 cooperate to provide a first arm opening and the access slots 48 and 62 cooperate to provide a second arm opening for reasons which will be made more apparent below.

The band applicator 10 includes a pot frame 64 having an upper end 66 and a lower end 68. A pot opening 70 is formed through the upper end 66 providing access to a pot receiving space 72. The pot receiving space 72 forms an inner peripheral surface 74 in the pot frame 64.

The upper end 66 of the pot frame 64 is generally circularly shaped in the form of the outer peripheral surface 26 of the flower pot 16 and the pot receiving space 72 also is configured in the shape of the outer peripheral surface 26 of the flower pot 16. The upper end 66 may be adapted to resiliently engage a portion of the outer peripheral. surface 26 of the flower pot 16 during the operation of the band applicator 10 in a manner such as that described in U.S. Pat No. 4,733,521, entitled, "Cover Forming Apparatus", issued on Mar. 29, 1988, which disclosure specifically hereby is incorporated herein by reference. In the alternative, the upper end 66 of the pot frame 64 may comprise a rigid or semi-rigid metal or plastic frame.

The pot frame 64, as shown in FIGS. 1, 2 and 3, is constructed of a plurality of interconnected metal or plastic elements 80. The elements 80 are interconnected to form the pot frame 64 so that the pot frame 64 is not a solid, impervious structure, but rather has openings formed therethrough, as shown in FIGS. 1, 2 and 3. In the alternative, the pot frame 64 could be constructed of a plastic or metal or wood, solid frame with the pot opening 70 and pot receiving space 72 formed therein in the manner described above.

The pot frame 64 is supported on the base frame 32. The pot frame 64 more particularly is supported on the base frame 32 so that the upper end 66 of the pot frame 64 is disposed generally within the top opening 44 with the upper end 66 of the pot frame 64 being disposed near or below the top support surface 38 of the top 36. The pot frame 64 may be supported on the base frame 32 so that the pot frame 64 is disposed above the top support surface 38. In this last mentioned embodiment, the base frame 32 no longer would require the top opening 44 or the access slots 46, 48, 60 or 62 for reasons which will become more apparent below.

The band applicator 10 also includes a band holder 82 which is configured to releasably hold a plurality of bands 12. As shown in FIGS. 1, 2 and 3, a plurality of bands 12 are disposed on the band holder 82.

The band holder 82 has a first end 84 and a second end 86. The bands 12 are disposed generally between the first and the second ends 84 and 86 of the band holder 82. In one preferred form, the first end 84 of the band holder 82 is connected to the lower end 68 of the pot frame 64 and the second end 86 of the band holder 82 is removably connected to the top 36 of the base frame 32. In this embodiment, the band holder 82 cooperates to support the pot frame 64 on the base frame 32. The band holder 82 extends from the top 36 downwardly a distance into the component space 40 for supporting the band holder 82 and the pot frame 64 within the component space 40 below the top 36. The band holder 82 could extend a distance upwardly from the top support surface 38 for supporting the band holder 82 above the top 36 if desired in a particular application, as mentioned before.

The band holder 82, more particularly, comprises a first band rod 88 and a second band rod 90. The first band rod 88 is spaced a distance from the second band rod 90. The first ends of the first and the second band rods 88 and 90 form the first end 84 of the band holder 82 and the second ends of the first and the second band rods 88 and 90 form the second end 86 of the band holder 82. An enlarged cap 92 is connected to or formed on the first end of the first band rod 88 and an enlarged cap 94 is connected to or formed on the first end of the second band rod 90.

A first key slot 96 is formed through the top 36. A second key slot 98 is formed through the top 36. The first key slot 96 is spaced a distance from the second key slot 98. The first and the second key slots 96 and 98 are disposed near the top opening 44 and spaced generally between the first and the second access slots 46 and 48. The first key slot 96 has an enlarged portion 100 and the second key slot 98 has an enlarged portion 102.

In operation, the cap 92 is disposed through the enlarged portion 100 and simultaneously the cap 94 is disposed through the enlarged portion 102. Then, the first and the second band rods 88 and 90 are slidingly moved in a direction generally toward the top opening 44 thereby sliding the first and the second band rods 88 and 90 within the first and the second key slots 96 and 98 to a position wherein the caps 92 and 94 are disposed over and engage a portion of the top 36 for preventing the band rods 88 and 90 from dropping through the first and second key slots 96 and 98, and for removably connecting the band holder 82 to the top 36 of the base frame 32.

The band holder 82 is removed in a reverse manner by moving the band rods 88 and 90 to a position wherein the caps 92 and 94 are disposed over the respective enlarged portions 100 and 102. In this position, the band rods 88 and 90 are removable through the enlarged portions 100 and 102 for disconnecting the band holder 82 from the top 36 of the base frame 32.

In operation, a plurality of the bands 12 are disposed on the band holder 82 with each of the bands 12 extending about the first and the second band rods 88 and 90, as diagrammatically illustrated in FIGS. 1 and 2. The caps 92 and 94 then are disposed through the enlarged portions 100 and 102, and the band rods 88 and 90 are slidingly moved in the respective first and second key slots 96 and 98 to connect the band holder 82 to the top 36 of the base frame 32. In this position, the band holder 82 and the pot frame 64 each are supported within the component space 40 of the base frame 32.

The operator then places the sheet of material 14 on the top support surface 38 and generally over the top opening 44. The sheet of material 14 thus is positioned generally over the upper end 66 of the pot frame 64. In this position of the sheet of material 14, the operator then positions the flower pot 16 generally over the sheet of material 14 and generally over the upper end; 66 of the pot frame 64 thereby positioning the flower pot 16 generally above the top opening 44 in the top 36 of the base frame 32.

The operator then lowers the flower pot downwardly to a position wherein the lower end 24 of the flower pot 16 engages the upper surface 18 of the sheet of material 14. The flower pot 16 then is further lowered pushing the sheet of material 14 and the flower pot 16 through the upper end 66 of the pot frame 64 and into the pot receiving space 72 of the pot frame 64. As the flower pot 16 is moved into the pot receiving space 72, the upper end 66 of the pot frame 64 engages the sheet of material 14 and presses the sheet of material 14 against the outer peripheral surface 26 of the flower pot 16 thereby forming the sheet of material 14 generally about the outer peripheral surface of the flower pot 16.

The flower pot 16 is moved into the pot receiving space 72 until the flower pot 16 engages a portion of the pot frame 64 thereby positioning the flower pot 16 and the pot frame 64 in the predetermined position shown in FIG. 2.

In this position, the upper surface 18 of the sheet of material 14 extends about the outer peripheral surface 26 of the flower pot 16 and a portion of the sheet of material 14 extends a distance upwardly beyond the upper end 22 of the flower pot 16, as shown in FIG. 2.

In this position of the flower pot 16 and the sheet of material 14, the operator extends the operator's arms through the access slots 60 and 62 in the side walls 34 of the base frame 32, as diagrammatically illustrated in FIGS. 2 and 3. The operator extends the operator's arms into the component space 40 to a position wherein the operator grasps one of the bands 12 on the band holder 82. The operator pulls the band 12 from the band holder 82 and extends the band 12 about the lower end 68 of the pot frame 64. The band 12 is extended about one side of the pot frame 64 due to the connection between the first end 84 of the band holder 82 and the pot frame 64 and the operator stretches the band over the lower end 68 and about a portion of the outer peripheral surface of the pot frame 64. The operator then pulls the band 12 over the outer peripheral surface to a position wherein the band is pulled above the upper end 66 of the pot frame 64 thereby positioning the band 12 about the sheet of material 14.

The band 12 elastically is stretched about the sheet of material 14 and the flower pot 16 outer peripheral surface 26 for engaging and holding the sheet of material 14 in position extending about the outer peripheral surface 26 of the flower pot 16. The operator then removes the flower pot 16 with the sheet of material 14 held thereabout by the band 12 from the pot frame 64. The band applicator 10 then is conditioned to receive another sheet of material and another flower pot.

As mentioned before, the pot frame 64 and band holder 82 may be positioned and disposed above the top support surface 38. In this embodiment, the operator will place the bands 12 about the sheet of material 14 and flower pot 16 in a manner exactly like that described before, except in this last-mentioned embodiment, the operator does not have to extend the operator's hands into the component space 40 since the top frame 64 and the band holder 82 each are disposed above the top support surface 38.

The term "band" as used herein means any material which may be secured about an object such as the flower pot 16, such bands commonly being referred to as elastic bands or rubber bands and also includes any other type of material such as a string or metal or rubber or plastic or ribbon or cloth or stribbon which may be secured about an object such as the flower pot 16. The band 12 also may include a bow if desired in a particular application.

The pot frame may be constructed of metal or plastic or any other suitable material. The upper end 66 of the pot frame 64 comprises a ring for engaging the sheet of material and forming the sheet of material about the flower pot 16 as the sheet of material 14 and the flower pot 16 are moved into the pot receiving space 72. The ring shaped upper end 66 may be a solid metal or plastic ring which rigidly engages the sheet of material or the ring may resiliently engage the sheet of material in any one of several ways disclosed in U.S. Pat. No. 4,733,521, entitled, Cover Forming Apparatus, referred to before and specifically is incorporated herein by reference.

In addition, a ring 104 (FIG. 1) may be positioned over the sheet of material 14 and the ring 104 initially is movable to engage the sheet of material 14 and move at least a portion of the sheet of material 14 into the pot receiving space 72. The ring 104 has a plurality of bracket legs for engaging the sheet of material 14 and cooperating to form controlled pleats in the sheet of material 14 as the sheet of material and the flower pot 16 are moved into the pot receiving space 72. A bracket of the type just described in connection with the ring 104 is disclosed in U.S. Pat. No. 5,127,817, entitled "Flat-Paneled Flower Pot or Flower Pot Cover Die", issued to Weder, et al. Jul. 7, 1992, which disclosure specifically hereby is incorporated herein by reference.

EMBODIMENT OF FIG. 4

Figure 4:
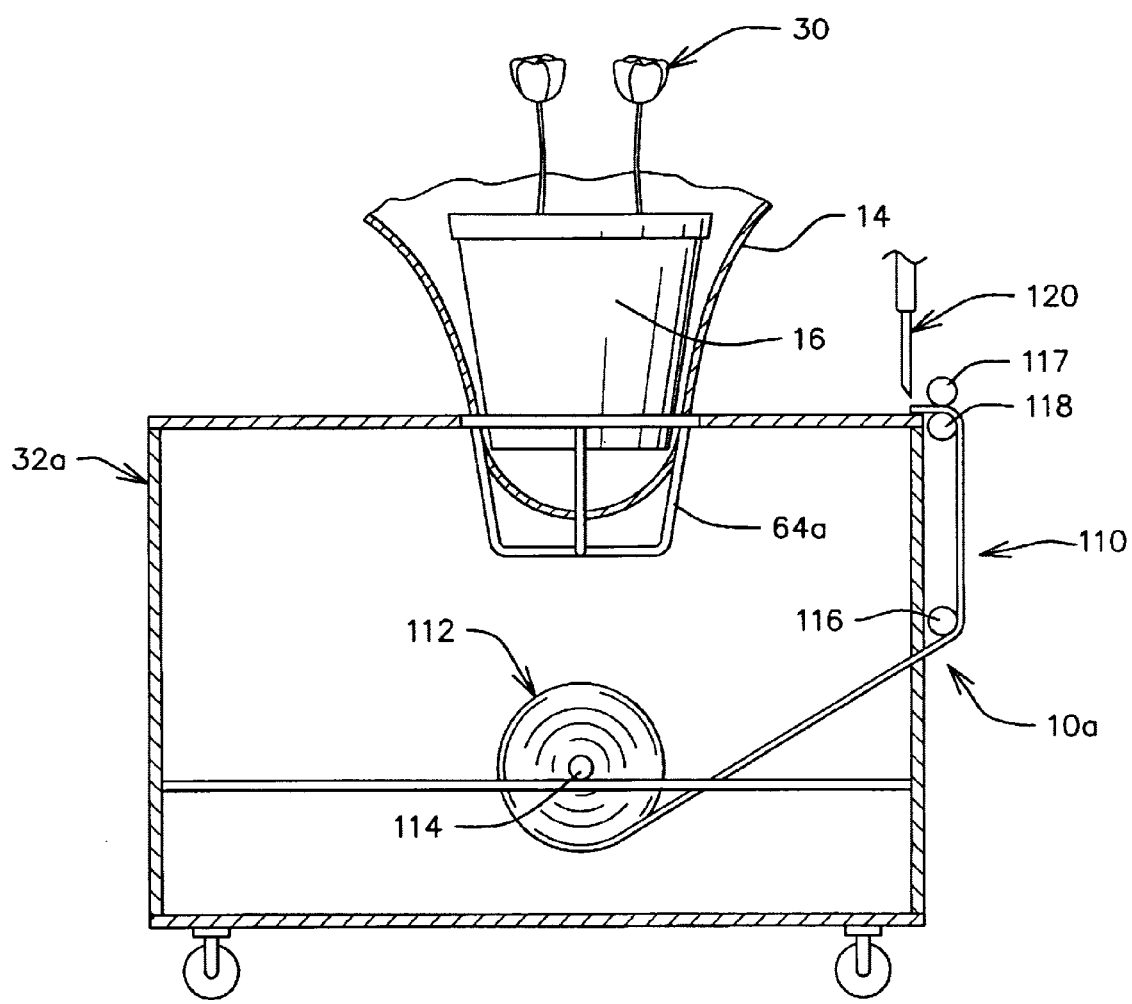
FIG. 4 is a side elevational view of a modified band applicator similar to the band applicators shown in FIGS. 1–3, but having the sheets of material dispensed from a roll of material where the sheets of material are cut from the roll of material.

Shown in FIG. 4 is a modified band applicator 10a which is constructed exactly like the band applicator 10 shown in FIGS. 1, 2 and 3 and described in detail before, except the band applicator 10a also includes a sheet dispenser 110 for dispensing the sheets of material 14. The band holder is not shown in FIG. 4, but it is included with the band applicator 10a. The sheet dispenser 110 includes of a roll of material 112 journally supported on a rod 114 which is generally connected to one of the side walls 34 of the base frame 32a. A pair of rollers 116 and 118 also are journally supported on one of the side walls 34 of the base frame 32a. The roller 118 cooperates with a roller 117. A cutter 120 is supported on the base frame 32a.

In this embodiment, material is unrolled from the roll of material 112 and extended about the rollers 116 and 118. The material is unrolled from the roll of material 112 and extended about the rollers 116 and 118 to a position wherein a portion of the material extends over the top support surface 38 of the base frame 32a and a portion of the material is disposed generally under the cutter 120. In this position, the cutter 120 is actuated by the operator and brought into engagement with the material thereunder for cutting the portion of the material extended over the top support surface 38 from the roll of material 112 thereby providing the sheet of material 14 on the top of the support surface 38.

Rather than supplying a roll of material such as the roll of material 112, the sheets of material 14 may be supplied in a pad form. In this last-mentioned embodiment, a sheet of material is removed from the pad of sheets of material 14 and applied about the flower pot 16 in the manner described before in connection with FIGS. 1–3.

EMBODIMENT OF FIG. 5

Figure 5:
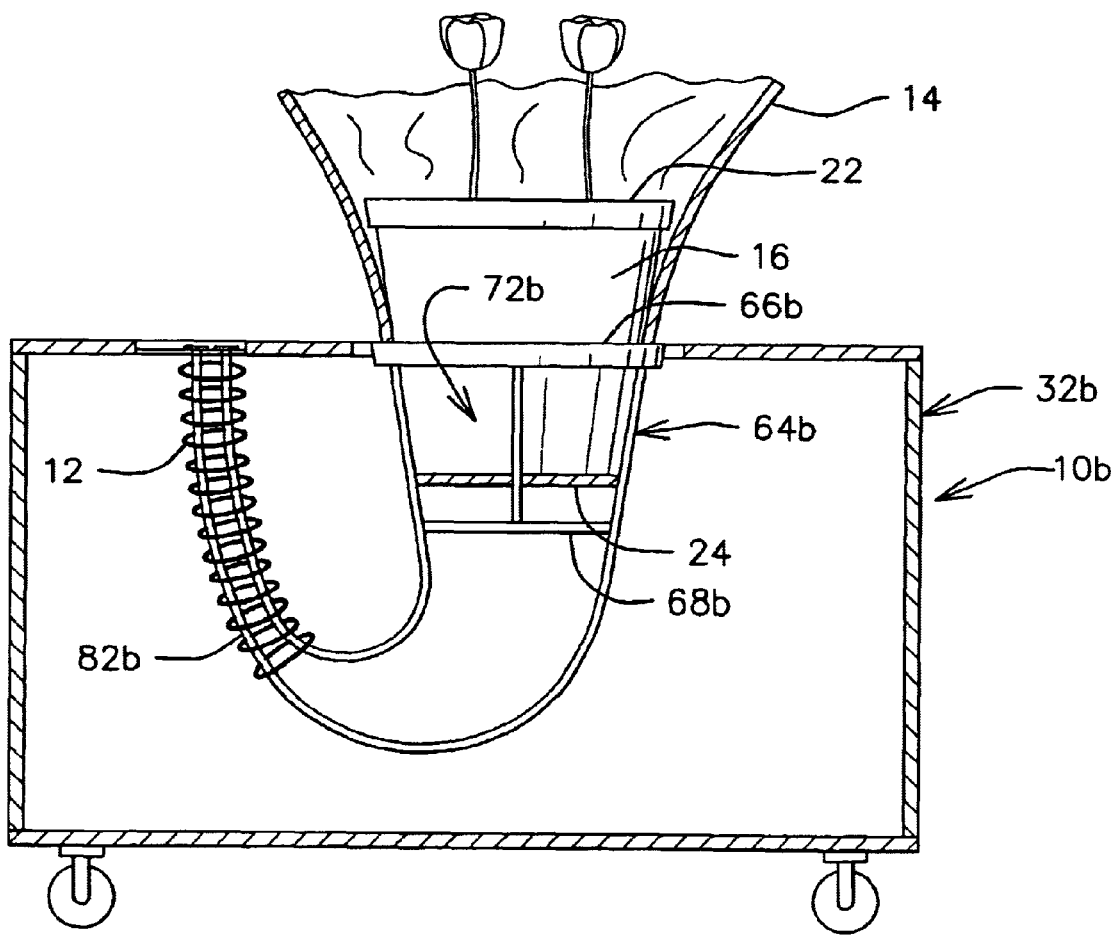
FIG. 5 is a view of a modified band applicator with a modified pot frame constructed such that the pot frame encompasses substantially the entire outer peripheral surface of the flower pot.

Shown in FIG. 5 is a band applicator 10b which is constructed exactly like the band applicator 10 shown in FIGS. 1, 2 and 3 and described in detail before, except the pot frame 64b is shaped to engage the lower end 24 of the flower pot 16 at a position wherein the upper end 22 of the flower pot 16 is disposed near the upper end 66b of the pot frame 64b and the flower pot 16 is substantially disposed within the pot receiving space 72b. In this embodiment, the band 12 is moved over the outer peripheral surface of the pot frame 64b in the manner described before to a position wherein the band 12 is extended above the upper end 66b of the pot frame 64b and brought into engagement with the portion of the sheet of material 14 extended above the upper end 22 of the flower pot 16.

EMBODIMENT OF FIG. 6

Figure 6:
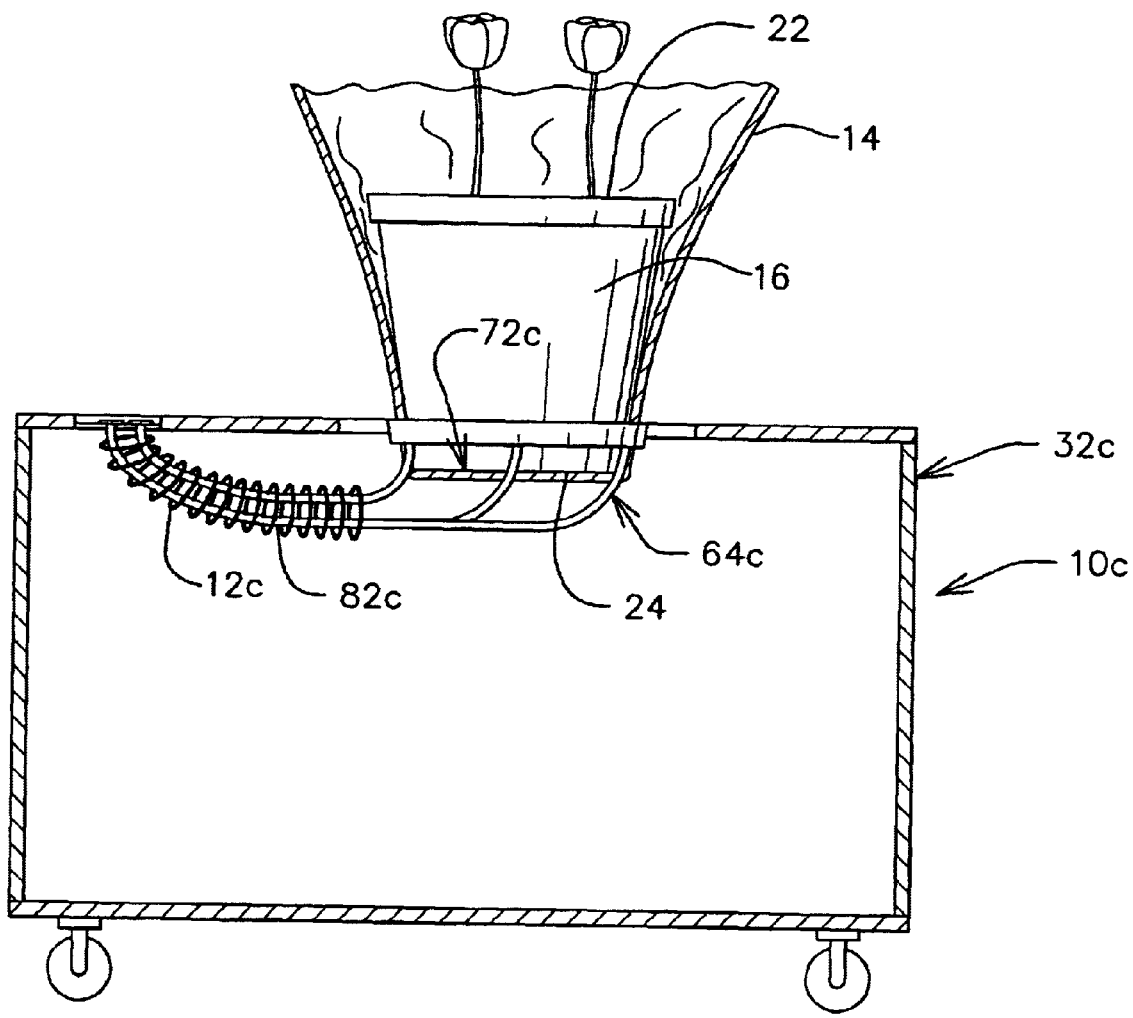
FIG. 6 is a view of another modified band applicator with a modified pot frame where the modified pot frame covers only a relatively small portion of the flower pot near the lower end of the flower pot.

Shown in FIG. 6 is a band applicator 10c which is constructed exactly like the band applicator 10 shown in FIGS. 1, 2 and 3 and described in detail before, except the pot frame 64c is configured to engage the lower end 24 of the flower pot 16 at a position wherein only a portion of the flower pot 16 near the lower end 24 thereof is disposed within the pot receiving space 72c of the pot frame 64c.

In this position, a substantial portion of the outer peripheral surface 26 of the flower pot 16 extends upwardly above the upper end 66c of the pot frame 64c. The band 12 is extended about the pot frame 64c in the manner described before and the band 12 is extended above the upper end 66c of the pot frame 64c to engage the sheet of material 14 at a position near the lower end 24 of the flower pot 16 thereby positioning the band 12 about the sheet of material 14 and about the outer peripheral surface 26 of the flower pot 16 at a position generally near and spaced a distance above the lower end 24 of the flower pot 16.

EMBODIMENT OF FIG. 7

Figure 7:
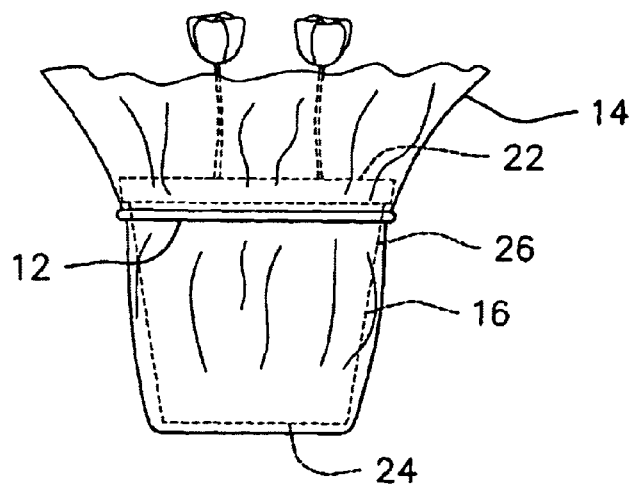
FIG. 7 is a view of a flower pot covered with a sheet of material with the band applied thereto.

Shown in FIG. 7 is a flower pot 16 with a sheet of material 14 disposed thereabout and held in place with a band 12. The band 12 is positioned about the sheet of material 14 and about the outer peripheral surface 26 of the flower pot 16 at a position near the upper end 22 of the flower pot 16.

FIG. 7 illustrates one position of the band 12 with respect to the sheet of material 14 and the flower pot 16. As illustrated and mentioned before, the configuration of the pot frame 64 determines the position of the upper end 66 of the pot frame 64 with respect to the upper and the lower ends 22 and 24 of the flower pot 16 thereby determining to a large extent the position of the band 12 with respect to the upper and the lower ends 22 and 24 of the flower pot 16.

EMBODIMENT OF FIG. 8

Figure 8:
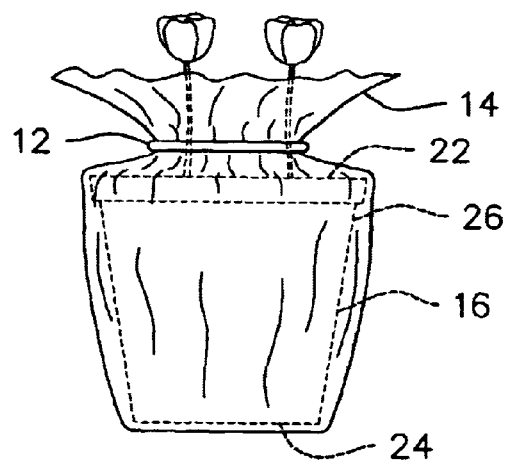
FIG. 8 is a view similar to FIG. 7, but showing the band applied at a different position with respect to the sheet of material and the flower pot.

Shown in FIG. 8 is the flower pot 16 with the sheet of material extended about the outer peripheral surface 26 of the flower pot 16 and the band 12 disposed about the sheet of material and positioned generally above the upper end 22 of the flower pot 16. The embodiment of the band applicator lob shown in FIG. 5 is adapted to position the band 12 above the upper end 22 of the flower pot 16 in the manner illustrated in FIG. 8.

EMBODIMENT OF FIG. 9

Figure 9:
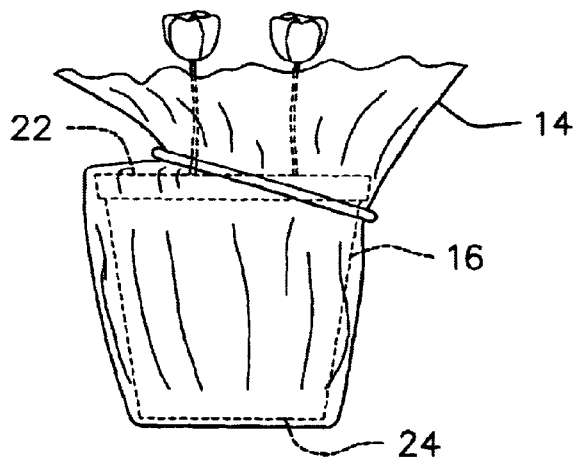
FIG. 9 is a view similar to FIG. 7, but showing the band applied at a different position with respect to the sheet of material and the flower pot.

Shown in FIG. 9 is the sheet of material 14 wrapped about the flower pot 16 with the band 12 extending diagonally across the flower pot 16 with a portion of the band being disposed above the upper end 22 of the flower pot 16 and another portion of the band being disposed below the lower end 24 of the flower pot 16. The embodiment shown in FIG. 9 further illustrates one other position where the band 12 may be placed in accordance with the present invention.

EMBODIMENT OF FIG. 10

Figure 10:
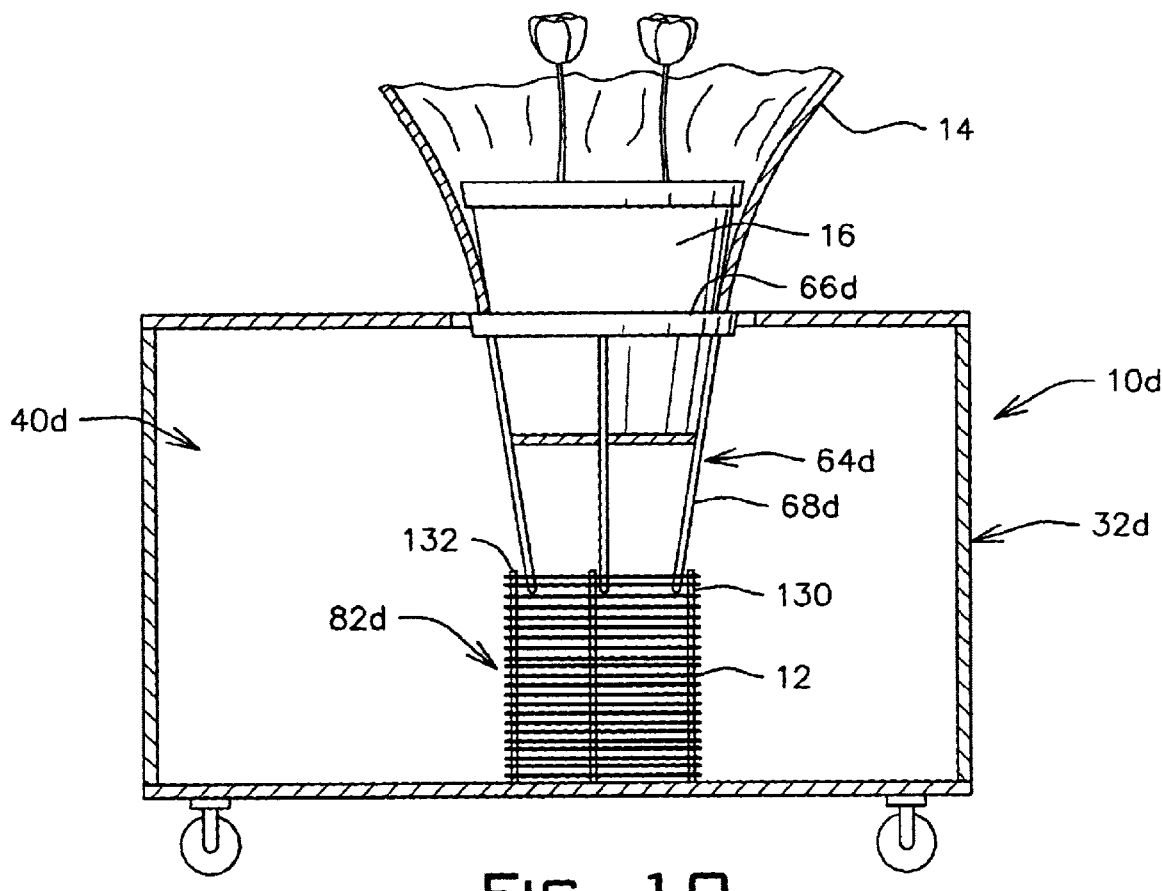
FIG. 10 is a sectional view of a modified band applicator with a modified pot frame and modified band holder showing a sheet of material and flower pot disposed in the pot frame.

Shown in FIG. 10 is another modified band applicator 10d which includes a modified pot frame 64d and a modified band holder 82d. The band holder 82d consists of a cylindrically shaped tube 130 having an upper end 132 and a lower end 134. The tube 130 is hollow and has an opening extending therethrough intersecting the upper end 132 thereof. The tube 130 is secured to the base frame 32d.

The modified pot frame 64d is constructed exactly like the pot frame 64 shown in FIGS. 1, 2 and 3 and described in detail before, except the lower end 68d of the pot frame 64d is tapered inwardly and narrowed and fitted within the opening in the tube 130. The upper end 132 of the tube 130 is connected to the lower end 68d of the pot frame 64d so that the band holder 82d cooperates to support the pot frame 64d within the component space 40d of the band applicator 10d.

The band applicator 10d will operate exactly like the band applicator 10 shown in FIGS. 1, 2 and 3 and described in detail before, except, in this embodiment, the operator places the operator's hands through the access slots (not shown) and into the component space 40d. The operator then removes the top band from the bands 12 disposed on the band holder 82d. The operator then moves the band 12 upwardly along the outer peripheral surface of the pot frame 64d to a position wherein the band 12 is moved over the upper end 66d of the pot frame 64d and onto the sheet of material 14. The flower pot 16 with a sheet of material 14 disposed thereabout is positioned in the pot frame 64d in a manner exactly like that described before with respect to the pot frame 64 shown in FIGS. 1, 2 and 3.

EMBODIMENT OF FIGS. 11, 12, 13, 14 AND 15

Figure 11:
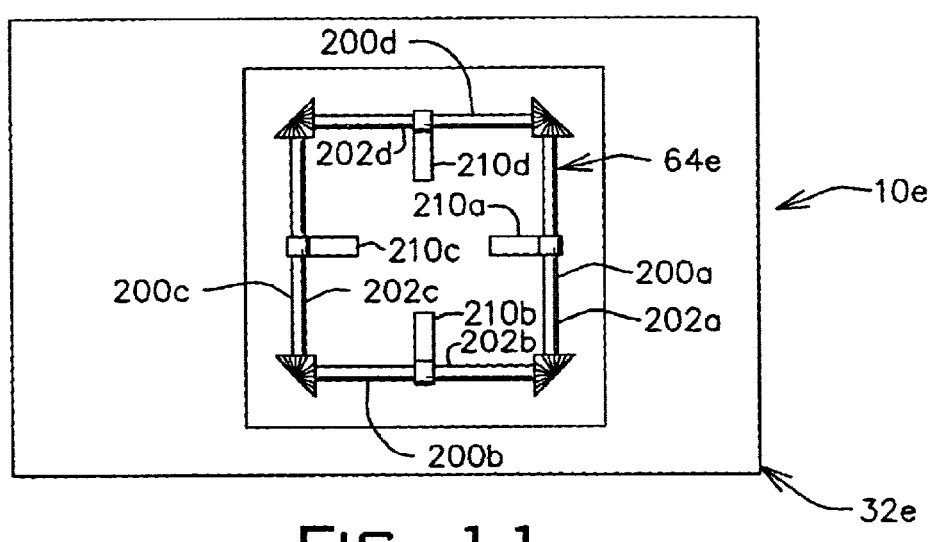
FIG. 11 is a diagrammatic, plan view of another modified band applicator having a modified pot frame and a modified band holder.
Figure 12:
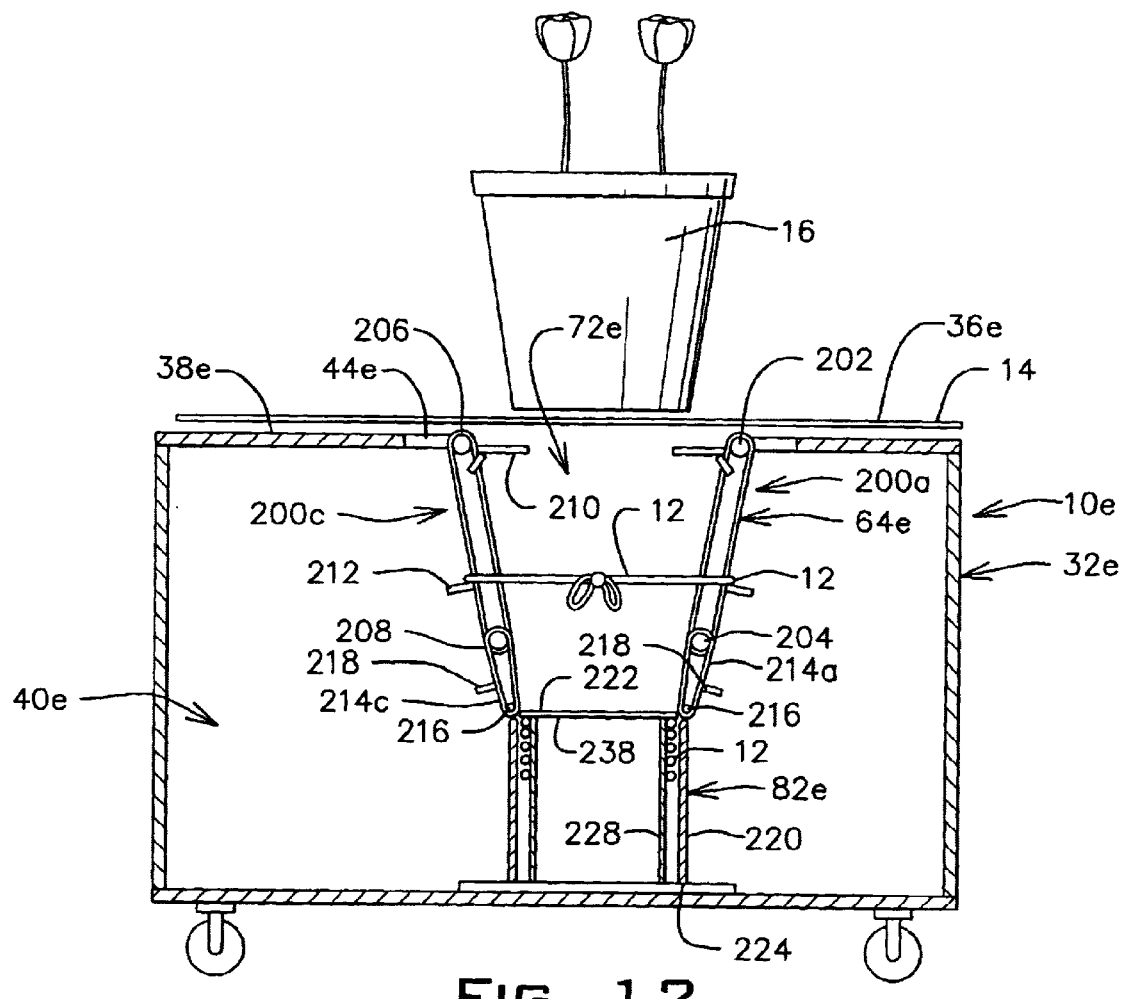
FIG. 12 is a sectional view of the modified band applicator of FIG. 11.
Figure 13:
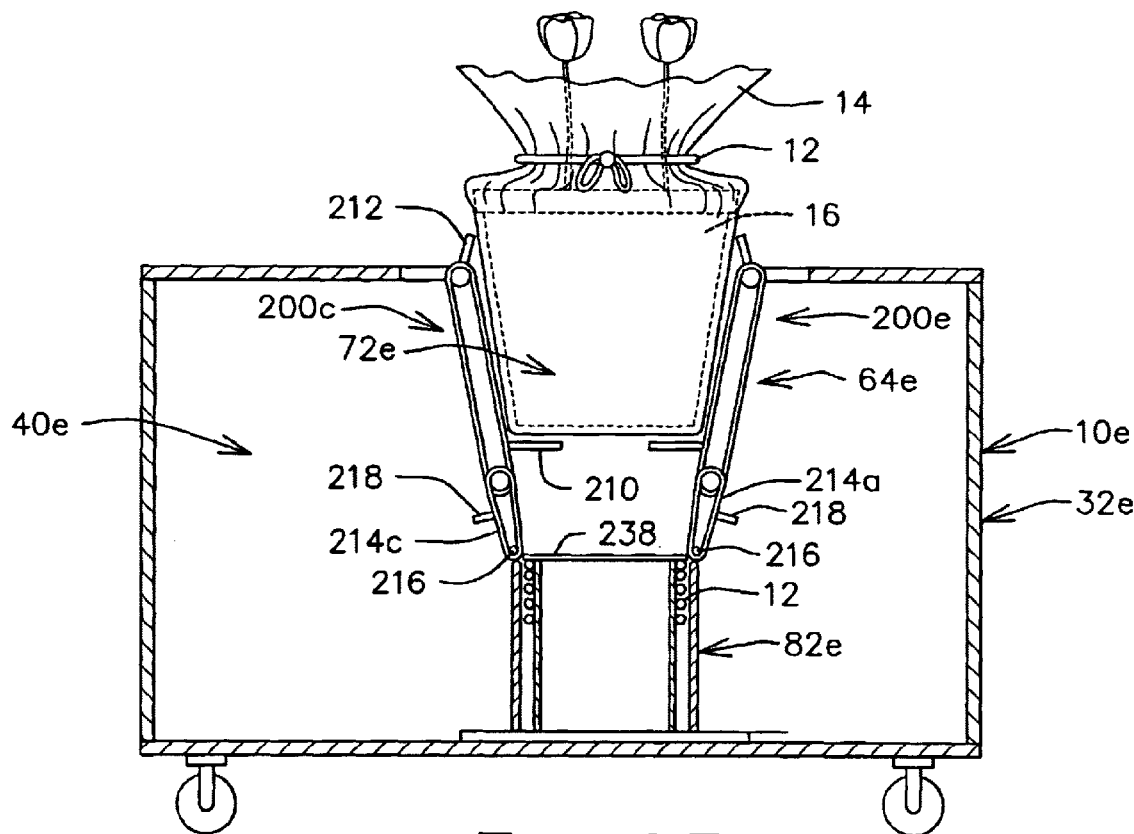
FIG. 13 is a side elevational view of a modified pot frame and a modified band holder.

Shown in FIGS. 11–13 is another modified band applicator 10e. The band applicator 10e includes a modified pot frame 64e and a modified band holder 82e.

The pot frame 64e comprises four conveyors 200 with the individual conveyors being designated in FIG. 11 with the individual reference numerals 200a, 200b, 200c and 200d (only certain components of the conveyors 200 being shown in FIG. 11). Each of the conveyors 200 is rollingly supported by way of shafts 202 and 204 which are generally supported on the 32e. Each of the conveyors 200 is disposed in the component space 40e. Each conveyor 200 has an upper end 206 and a lower end 208 (the upper and the lower ends 206 and 208 being designated in FIG. 12 only with respect to one of the conveyors 200. Each of the conveyors 200 is disposed in the component space 40e and extends angularly upwardly toward the top 36e with the upper end 206 of each of the conveyors 200 being disposed generally within the top opening 44e of the base frame 32e.

Each of the conveyors 200 includes a pair of arms 210 and 212. One end of each of the arms 210 and 212 is secured to one of the conveyors 200. The arms 210 and 212 are disposed on the respective conveyors 200 and spaced about 180° apart for reasons which will become more apparent below.

The pot frame 64e also includes four secondary conveyors 214, only two of the secondary conveyors 214 being shown in FIGS. 12 and 13 and designated therein by the reference numerals 214a and 214c. Each of the secondary conveyors 214 is rollingly supported on the shaft 204 and on a shaft 216. A hook 218 (FIGS. 12 and 13) is connected to each of the secondary conveyors 14.

Figure 14:
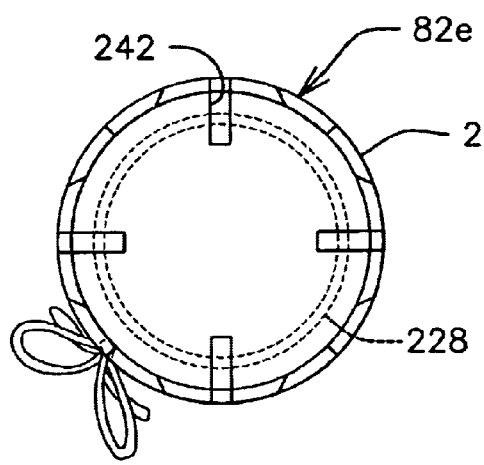
FIG. 14 is a top elevational view of the modified band holder of FIG. 13.
Figure 15:
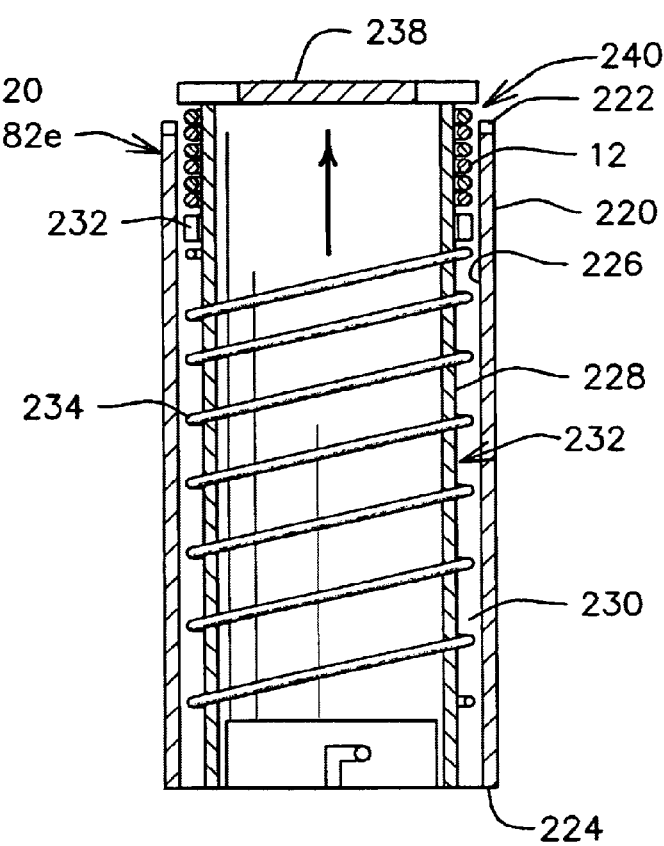
FIG. 15 is a sectional view of the modified band holder of FIG. 14.

The modified band holder 82e, as shown more clearly in FIGS. 12, 14 and 15 basically comprises an outer tube 220 having an upper end 222 and a lower end 224 with an opening 226 (FIG. 15) extending through the outer tube 220 intersecting the upper end 222. An inner tube 228 is disposed within the opening 226 of the outer tube 220 and the inner tube 228 is slidably disposed within the opening 226 of the outer tube 220. The diameter of the inner tube 228 is less than the diameter formed by the inner peripheral surface of the outer tube 220 so that a gap 230 (FIG. 15) exists between the outer peripheral surface of the inner tube 228 and the inner peripheral surface of the outer tube 220.

A sleeve 232 (FIG. 15) is disposed about the inner tube 228. The sleeve 232 is slidingly disposed between the inner tube 228 and the outer tube 220.

A spring 234 (FIG. 15) is disposed in the gap 230 between the inner tube 228 and the outer tube 220. The spring 234 biases the sleeve 232 in an upwardly direction 236 (FIG. 15). A plurality of bands 12 are disposed in the gap 230 between the inner tube 228 and the outer tube 220. The sleeve 232 engages the bottom band 12 with the spring 234 biasing the sleeve 232 and the bands 12 disposed thereabove in the upwardly direction 236.

A cap 238 (FIG. 12, 13 and 15) is connected to the upper end of the inner tube 228. The inner tube 228 is positioned in the outer tube 220 and sized such that the cap 238 or, in other words, the upper end of the inner tube 228 is disposed a distance above the upper end 222 of the outer tube 220 thereby leaving a band disposal gap 240 (FIG. 15) between the cap 238 and the upper end 222 of the outer tube 220. The band disposal gap 240 is sized to accommodate a single band 12. A plurality of slots 242 (four slots 242 being shown in FIG. 14 with only one being designated with a reference numeral) are formed in the cap 238 with a portion of each of the slots 242 intersecting a portion of the upper end of the inner tube 228 for reasons which will be made more apparent below.

In operation, the conveyors 200 initially are positioned as shown in FIG. 12. In this position, the arms 210 are disposed near the upper end 206 of the conveyor 200 and each of the arms 210 extend radially inwardly into the pot receiving space 72e. The sheet of material 14 is disposed on the top support surface 38e and the flower pot 16 is positioned above the pot frame 64e and above the sheet of material 14, as shown in FIG. 12. In this position, the flower pot 16 is moved in the downwardly direction engaging the sheet of material 14 and pushing the sheet of material 14 downwardly into the pot receiving space 72e of the pot frame 64e. As the flower pot 16 is moved in the downwardly direction with the sheet of material 14, a portion of the sheet of material 14 and a portion of the lower end 24 of the flower pot 16 engages the arms 210. The movement of the flower pot 16 in the downwardly direction causes the arms 210 to be moved in the downwardly direction thereby rotating the conveyors 200.

As the conveyors 200 are rotated by the downward movement of the flower pot 16, the secondary conveyors 214 also are rotated by way of the rotational movement of the conveyors 200 and the rotation of the common shaft 204. As the secondary conveyors 214 are rotated, the hooks 218 on the secondary conveyors 214 are moved through the slots 242 to engage and pick up the top band 12 from the band holder 82e. The further rotation of the secondary conveyors 214 causes the hooks 218 to lift the band 12 from the band holder 82e and move the band 12 in the upwardly direction along the secondary conveyors 214.

When the band 12 reaches the conveyors 200, the band 12 is transferred from the secondary conveyors 214 to the conveyors 200. The movement of the conveyors 200 causes the band 12 to be moved in the upwardly direction toward the upper end 206 of the conveyors 200. The conveyors 200 and the secondary conveyors 214 are sized and positioned with respect to the size of the flower pot 16 such that, when the flower pot 16 is moved in the downwardly direction to a position engaging a portion of the conveyors 200 thereby positioning the flower pot 16 in the proper position within the pot receiving space 72e, the conveyors 200 will have moved the band 12 over the upper ends 206 of the conveyors 200 thereby automatically dispensing the band 12 from the conveyors 200 and disposing the band 12 about the sheet of material 14 for cooperating to hold the sheet of material 14 in the position extending about the sheet of material 14 in the manners described before.

It also should be noted that the arms 210 and 212 are movably positioned on the conveyors 200 such that, when the flower pot 16 with the sheet of material 14 positioned thereabout has been positioned within the pot receiving space 72e of the pot frame 64e, the arms 210 or 212 engage the flower pot 16 thereby causing the arms 210 or 212 to be moved in the upwardly direction to a position as shown in FIG. 13 so that the flower pot 16 may be properly positioned in the pot receiving space 72e. In one form, the positioning of the arms 210 and 212 may be controlled by a cam connected to the arms 210 and 212 and operably connected to the conveyors 200.

EMBODIMENT OF FIG. 16

Figure 16:
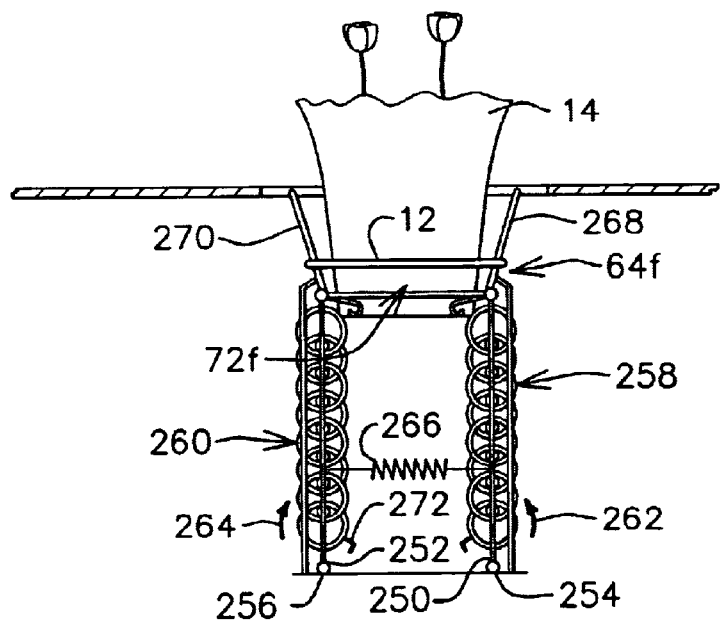
FIG. 16 is a diagrammatic view of a modified band applicator showing a flower pot and a sheet of material disposed in the modified band applicator.

Shown in FIG. 16 is a modified pot frame 64f adapted to be utilized with the band holder 82e of FIG. 15 or any other similar band holder. As shown in FIG. 16, the pot frame 64f comprises at least two and preferably four arms with only two arms 250 and 252 being shown in FIG. 16. The lower end of each arm 250 and 252 is pivotally connected to the base frame 32 or the band holder 82e by way of pivot connections 254 and 256.

A plurality of planetary gears 258 are rotatingly connected to the pivot arm 250 and a plurality of planetary gears 260 are rotatingly connected to the arm 252. The planetary gears 258 and 260 are identical in construction and operation. The planetary gears 258 and 260 are gearingly interconnected such that each of the planetary gears 258 and 260 rotates in the same direction 262 or 264 respectively. A spring 266 is connected to the arms 250 and 252. The spring 266 biases the arms 250 and 252 in a direction generally toward each other.

A rod 268 is pivotally connected to the upper end of the arm 250 and a rod 270 is pivotally connected to the upper end of the arm 252.

The flower pot 16 and the sheet of material 14 are positioned in the pot receiving space 72f formed by the rods 268 and 270 in a manner similar to that described before. The planetary gears 258 and 260 are driven in the directions 262 and 264 by way of a belt drive connected to a motor (not shown) or any other desirable drive means. A hook 272 is connected to each of the bottom planetary gears 258 and 260. As the planetary gears 258 and 260 are rotated the hooks 272 are moved through the slots 242 in the band holder 82e and each of the hooks 272 hooks the top band 12 and moves the top band 12 along the outer peripheral surface of the planetary gears 258 and 260. As the planetary gears 258 and 260 are rotated, the band 12 is moved along the outer peripheral surface of the planetary gears 258 and 260 and transferred from one gear to the other causing the band 12 to be moved in the upwardly direction toward the upper ends of the arms 250 and 252.

When the band 12 has been moved to and over the upper ends of the arms 250 and 252, the band 12 is released onto the rods 268 and 270. The flower pot 16 is moved into the pot receiving space 72f causing the rods 268 and 270 to be pivoted thereby moving the band 12 upwardly along the rods 268 and 270 to a position where the band 12 is released over the upper ends of the rods 268 and 270 and positioned about the sheet of material 14 for cooperating to hold the sheet of material 14 about the flower pot 16 in the manners described before.

When the flower pot 16 is positioned in the pot receiving space 72f, the flower pot 16 engages the rods 268 and 270 causing the rods to pivot in the manner described before and causing the arms 250 and 252 to be moved outwardly in a direction generally away from each other against the biasing force of the spring 266. When the flower pot 16 is removed from the pot receiving space 72f, the spring 266 biasingly moves the arms 250 and 252 back to the initial or start position. When the band 12 is released in the manner just described, a new band is picked up from the band holder 82e and moved along the planetary gears 258 and 260 and positioned on the rods 268 and 270 thereby conditioning the pot frame 64f for receiving another flower pot 16 and sheet of material 14.

The planetary gears 258 and 260 may be replaced by a conveyor belt if desired in some applications or any other means for picking up the band 12 from the band holder 82e or other band holder and moving the band onto the rods 268 and 270.

EMBODIMENT OF FIGS. 17 AND 18

Shown in FIGS. 17 and 18 is another modified pot frame 64f which may be used with the band holder 82e or other equivalent band holder. The pot frame 64f includes a plurality of triangularly shaped rod structures 302 (only two rod structures 302 being shown in FIGS. 17 and 18). The lower end of the rod structures 302 are disposed near the upper end of the band holder 82e and a hook 304 is connected to a portion of the lower end of each of the rod structures 302 and positioned for picking up the top band from the band 12 holder 82e.

In the initial or start position shown in FIG. 17, a portion of each of the rod structures 302 extends into the pot receiving space 72f and the hooks 304 are positioned in the band holder 82e for removing the top band 12 from the band holder 82e. When the pot 16 is lowered into the pot receiving space 72f, the pot 16 engages a portion of the rod structures 302 causing the rod structures 302 to be pivotally moved outwardly thereby causing the hooks 304 to hookingly engage and hookingly remove the top band 12 from the band holder 82e. As the rod structures 302 are pivoted outwardly as a result of the flower pot 16 being moved downwardly into the pot. receiving space 72f, the band 12 is caused to be moved along the outer peripheral surface of the rod structures 302 and upwardly along the rod structures 302 to a position wherein the band 12 is moved over the upper ends of the rod structures 302 and dispenses therefrom onto the sheet of material 14 and the flower pot 16 disposed in the pot receiving space 72f. When the flower pot 16 and the sheet of material 14 with the band 12 disposed thereabout are removed from the pot receiving space 72f, the rod structures 302 are pivotally moved back to the initial or start position shown in FIG. 17 by way of springs 306 which are connected between the rod structures 302 and the pot frame 64f for biasing the rod structures 302 to the initial or start position.

EMBODIMENT OF FIGS. 19 AND 20

Shown in FIGS. 19 and 20 is a modified pot frame 64h. The modified pot frame 64h comprises a plurality of arms 320 which are pivotally supported on the base frame 32 for pivotal movement about a pivot connection 322 (only two arms 320 are shown in FIGS. 19 and 20 for the purpose of illustration and it is understood that at least two sets of arms 320 and preferably four sets of arms 320 actually comprise the modified pot frame 64h). A secondary arm 324 is secured to the arm 320 and a hook 326 is formed on one end of the secondary arm 324. The arms 320 and the secondary arms 324 are configured and positioned so that in the initial or start position, the hooks 326 are disposed in the band holder 82e for hookingly engaging the uppermost band 12 in the band holder 82e.

In operation, the flower pot 16 is moved into the pot receiving space 72h and the pot engages the secondary arms 324 causing the secondary arms to be pivoted in the downwardly direction so the hooks 326 hookingly engage and hookingly remove the top band 12 in the band holder 82e. As the secondary arms 324 are pivoted in the downwardly direction, the arms 320 also are pivoted in a direction generally toward the flower pot 16 as a result of the pivotable movement of the secondary arms 324. This causes the band 12 to be moved along the secondary arms 324 and onto the arms 320 where the band 12 is moved up and over the upper ends of the arms 320 as a result of the further pivotable movement of the arms 320 in the direction toward the flower pot 16 for dispensing the band 12 onto the sheet of material 14 in the manners and for reasons described before.

EMBODIMENT OF FIG. 21

Shown in FIG. 21 is another modified pot frame 64g which may be used in cooperation with a band holder like the band holder 82e for example. The pot frame 64g comprises a plurality of arms 310 which are pivotally supported on the base frame 32 at a pivot connection 312. Each of the arms 310 includes a pot engaging flange 314 disposed near the lower end of the respective arms 310. The arms 310 cooperate to form the pot receiving space 72g. A hook 316 is formed on the lower end of each of the respective arms 310. Each of the hooks 316 is positioned with respect to the band holder 82e so that the hooks 316 removably engage the upper band 12 in the band holder 82e.

In operation, the flower pot 16 is moved into the pot receiving space 72g to a position wherein the lower end 24 of the flower pot 16 with the sheet of material 14 disposed thereabout engages the respective pot engaging flanges 314 thereby pivotally moving the arms 310 in directions 318. As the arms are moved in the directions 318, the hooks 316 engage and remove the upper band 12 in the band holder 82e. As the arms 310 continue to move in the direction 318, the band 12 is moved along the arms 310 and over the upper ends of the arms 310 for positioning the band 12 about the sheet of material 14 for cooperating to hold the sheet of material 14 on the flower pot 16 in any one of the manners described before.

EMBODIMENT OF FIG. 22

Figure 22:
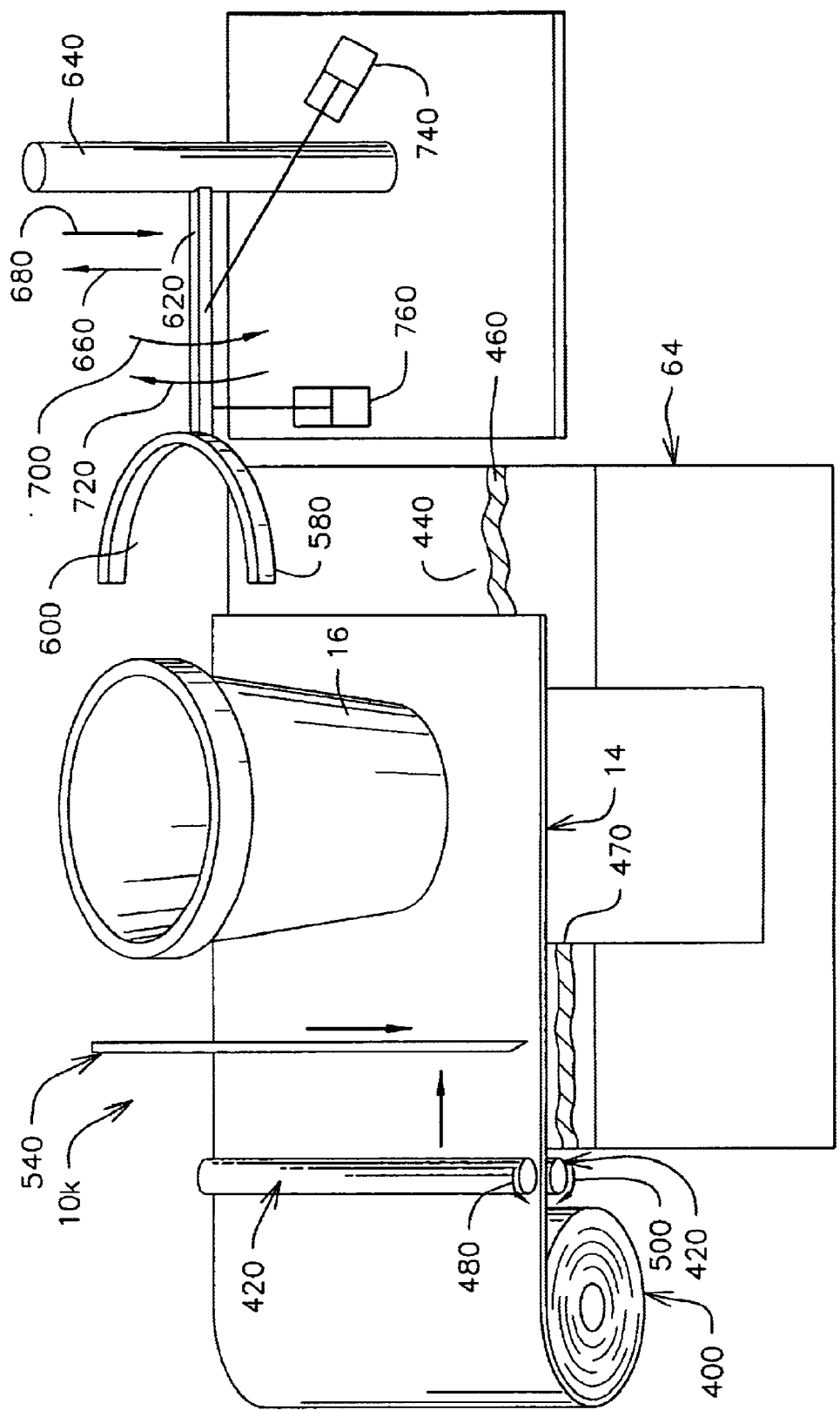
FIG. 22 is a diagrammatic, schematic view of another modified band applicator for automatically positioning the sheet of material and the pot.

Shown in FIG. 22 is a modified band applicator 10k for securing the sheet of material 14 about the flower pot 16 in 10k any manners described before. The band applicator 10k includes a roll of material 400 which is supported so that material may be unrolled from the roll of material 400. The material in the roll of material 400 extends from the roll of material 400 through a pair of rollers 420 and over a portion of an upper surface 440 of a platform 460. The platform 460 includes a flower pot opening 470. The upper surface 440 corresponds to the top support surface 38, the platform 460 corresponds to the top 36 and the flower pot opening 470 corresponds to the top opening 44.

At least one of the rollers 420 is powered so that, by rollingly actuating the rollers 420, the rollers 420 are rotated in the respective directions 480 and 500 as indicated in FIG. 22 to move the material in a general direction 520 to a position wherein a predetermined amount of the material has been disposed generally over the flower pot opening 470 in the platform 460. After a predetermined amount of the material has been unrolled from the roll of material 400 and positioned generally over the flower pot opening 470, a knife 540 is actuated and moved in a downward direction 560 to a position wherein the knife 540 cuttingly engages the material thereby severing a sheet of material 14 from the roll of material 400. The knife 540 is shown in FIG. 22 in the cutting position.

The applicator 10k also includes a generally U-shaped fork 580 forming an opening 600 which is connected to one end of a bar 620. The opposite end of the bar 620 is movably connected to a post 640 so that the bar 620 may be moved in an upward direction 660 or in a downward direction 680. The bar 620 also is pivotally connected to the post 640 so that the bar 620 may be rotated in a first direction 700 and in a second direction 720.

A first hydraulic cylinder 740 is connected to the bar 620 for moving the bar 620 in the upward or the downward direction 660 or 680. A second hydraulic cylinder 760 is connected to the bar 620 for moving the bar 620 in the direction 700 or 720.

In operation, the flower pot 16 is disposed in the opening 600 in the fork 580 and supported in the fork 580. The bar 620 is moved by the hydraulic cylinders 740 and 760 to position the flower pot 16 generally over the flower pot opening 470 and over the pot frame 64. After the sheet of material 14 has been cut from the roll of material 400, the second hydraulic cylinder 760 is actuated to move the bar 620 and the flower pot 16 connected thereto in the downward direction 680 thereby moving the flower pot 16 and the sheet of material 14 through the flower pot opening 470 into the pot frame 64. The band 12 is then applied to the sheet of material 14 in any one of the several manners described before.

After the band 12 has been applied to the sheet of material 14 and the flower pot 16, the second hydraulic cylinder 760 is actuated to move the bar 620 and the flower pot 16 connected thereto in the upward direction 660 to a position wherein the flower pot 16 is positioned generally above the flower pot opening 470 and generally above the upper surface 440 of the platform 460. The first hydraulic cylinder 740 then is actuated to pivotally move the bar 620 and the flower pot 16 connected thereto in the direction 720 so the flower pot 16 with the sheet of material 14 secured thereto by the band 12 can be removed from the fork 580 and another flower pot can be disposed in the fork 580.

Changes may be made in the construction and the operation of the various components, elements and assemblies of the band applicators described herein and changes may be made in the steps or the sequence of steps of the methods described herein without departing from the spirit and scope of the invention as defined in the following claims.

What is claimed is:

1. A method for securing a decorative cover about a floral grouping, comprising:
    providing the floral grouping,
    wrapping a sheet of material about the floral grouping to provide the decorative cover for the floral grouping;
    providing a band holder configured to hold a plurality of bands, the band holder having an opening therein adapted to receive the floral grouping having the decorative cover formed about at least a portion thereof;
    moving the floral grouping having the decorative cover extending about at least a portion thereof into a predetermined position within the opening in the band holder; and
    automatically positioning the band about the decorative cover for securing the decorative cover about the floral grouping.

* * * * *

UNITED STATES PATENT AND TRADEMARK OFFICE
CERTIFICATE OF CORRECTION

PATENT NO. : 6,668,521 B1  Page 1 of 1
APPLICATION NO. : 09/012907
DATED : December 30, 2003
INVENTOR(S) : Donald E. Weder et al.

It is certified that error appears in the above-identified patent and that said Letters Patent is hereby corrected as shown below:

Column 5, Line 26: After the word "peripheral" delete the "period".

Column 6, Line 63: After the word "end" delete the "semi-colon".

Column 7, Line 55: After the word "the" and before the word "frame" delete the word "top" and replace with the word --pot--.

Column 8, Line 7: After the word "entitled" delete the "comma".

Column 9, Line 48: Before the word "shown" delete the word "lob" and replace with --10b--.

Column 10, Line 40: After the word "the" and before the number "32e" insert the words --base frame--.

Column 10, Line 61: After the word "conveyors" delete the number "14" and replace with the number --214--.

Column 13, Line 50: After the word "pot" and before the word "receiving" delete the "period".

Column 14, line 61: Before the word "any" delete the number "10k".

Signed and Sealed this

Second Day of January, 2007

JON W. DUDAS
*Director of the United States Patent and Trademark Office*